US011797991B2

(12) United States Patent
Ravi et al.

(10) Patent No.: US 11,797,991 B2
(45) Date of Patent: Oct. 24, 2023

(54) SYSTEMS AND METHODS FOR SECURE TRANSACTION REVERSAL

(71) Applicant: Synchrony Bank, Stamford, CT (US)

(72) Inventors: Viveka Vardhan Ravi, Stamford, CT (US); Tushar Divecha, Stamford, CT (US); Deborah Bernert, Stamford, CT (US); Jonathan M. Schmidt, Stamford, CT (US); Ashok Uppalapati, Stamford, CT (US); Ajay Yadav, Stamford, CT (US); Craig Urbansky, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 17/365,266

(22) Filed: Jul. 1, 2021

(65) Prior Publication Data
US 2022/0005034 A1     Jan. 6, 2022

Related U.S. Application Data

(60) Provisional application No. 63/047,233, filed on Jul. 1, 2020.

(51) Int. Cl.
*G06Q 20/40* (2012.01)
(52) U.S. Cl.
CPC .................. *G06Q 20/401* (2013.01)
(58) Field of Classification Search
CPC .................................................. G06Q 20/401
See application file for complete search history.

(56) References Cited

U.S. PATENT DOCUMENTS

| | | | | |
|---|---|---|---|---|
| 2002/0143655 | A1* | 10/2002 | Elston | G06Q 20/04 705/26.81 |
| 2013/0226803 | A1* | 8/2013 | Hsu | G06Q 20/382 705/44 |
| 2014/0351069 | A1* | 11/2014 | Christner | G06Q 20/023 705/16 |

(Continued)

OTHER PUBLICATIONS

Square Seller Community, dated Jul. 18, 2019 https://www.sellercommunity.com/t5/Questions-How-To/How-do-I-set-up-a-password-so-employee-cannot-open-the-cash/m-p/127825 (Year: 2019).*

(Continued)

*Primary Examiner* — Bennett M Sigmond
*Assistant Examiner* — Raven E Yono
(74) *Attorney, Agent, or Firm* — Polsinelli LLP

(57) ABSTRACT

Examples describe data security for communication systems. One example includes validating a merchant system using merchant data and generating a set of merchant credentials. The set of merchant credentials is then used in authentication to facilitate a secure transaction, which involves automatically generating transaction data with a tokenized client account number associated with the secure transaction. A refund request associated with the secure transaction is received with the set of merchant credentials that are used for automatically authenticating the merchant system. The example then involves accessing a database that includes the transaction data for automatically facilitating settlement of a refund payment using the authenticated merchant system and the transaction data.

18 Claims, 12 Drawing Sheets

(56) References Cited

U.S. PATENT DOCUMENTS

2015/0081546 A1* 3/2015 Chauhan .......... G06Q 20/4097
 705/44
2015/0302406 A1* 10/2015 Pastore ................ G06Q 40/02
 705/44
2019/0197506 A1* 6/2019 McShirley ............ G06Q 20/16

OTHER PUBLICATIONS

Timothy R. Gallagher, "Are funds from customer credit card payments going to your employees," dated Jun. 30, 2015 https://www.troutcpa.com/blog/are-funds-from-customer-credit-card-payments-going-into-your-employees-pocket (Year: 2015).*
Sellercloud Documentation, "Employee Permissions and Roles" dated Sep. 25, 2019 https://help.sellercloud.com/omnichannel-ecommerce/employee-permissions-and-roles/ (Year: 2019).*

* cited by examiner

SYSTEMS AND METHODS FOR SECURE TRANSACTION REVERSAL

CROSS REFERENCE TO RELATED APPLICATIONS

This application claims priority to U.S. Provisional Application 63/047,233, filed Jul. 1, 2020, the entire content of which is incorporated herein by reference.

FIELD

The present disclosure relates generally to data security and transactions, as well as integration of shared authentication for secure transactions and associated reversals of the secure transactions in a communication system. In one example, the systems and methods described herein may be used to implement data security and facilitate transaction authorization as well as authorization of a transaction reversal in a variety of transactional contexts, including a batch transaction reversal process.

BACKGROUND

Clients often seek to obtain and use credit from a lending institution for a variety of purposes. In some circumstances, a client may interact with a merchant in an environment where the client does not have access to the client's account number, or where the client prefers additional security and protection for the client's data. Additionally, in some circumstances, a client may interact with a single entity to make a single payment to multiple different merchants. Managing a transaction in such environments can create barriers to completing transactions between clients, merchants, and lenders. Additionally, other considerations can be involved in such transactions, such as lender and merchant concerns related to fraud, and regulatory controls on data sharing when the data used in such transactions can be subject to a variety of privacy and regulatory considerations. Similarly, clients can seek to reverse transactions in a variety of contexts allowed based on the agreement between a client and a merchant that use a transaction network. Such considerations in both the context of the transaction and the transaction reversal can further create barriers in the context of network communications and data management in a communication system.

SUMMARY

Disclosed examples may provide systems to standardize merchant authentication for secure transactions and transaction reversals (e.g. refunds) for the transaction. Examples include a framework to implement data security for client data used as part of a network transaction. In this data security context, sensitive client information, such as an account number, can be kept from the merchant system (e.g. using tokenization). In such a context, when a customer reverses a transaction, the merchant only has access to a tokenized client account number or any tokenized account number. In such a context, the account security system can be used to facilitate the transaction reversal while still maintaining a separation between the merchant system and the sensitive client information. Further, the involvement in refund operations of the same account security system that was involved in the initial transaction allows efficiencies in leveraging a shared authentication structure. This allows the authentication (e.g. a merchant identifier and password, or other such data) used for the secure transaction to be used for the refund of payment involved in the transaction. Such structures provided added data security while preventing redundancy between initial transaction operations and refund operations. This improves the operation of a communication system and devices in the communication system by enabling additional functionality with similar computing resources.

Additionally, in some examples can create further efficiency and improve device performance with batch processing of certain transactions. Such structures can include a parent account layer used for authentication, and a child account layer used to settle specific transactions and transaction reversals. In a batch processing refund system, a parent merchant account can be used to aggregate refunds for multiple transactions. During refund processing, the parent merchant account can be used for authentication, and specifics of each transaction can be managed in a loop with the client merchant account to settle the refund for each transaction. Such structures further improve operations of a communication system and devices in a communication system by using fewer processing resources for authentication, and allowing a system to group processing operations for efficient handling. This can include time-shifting benefits for aggregated transaction reversals where an instant settlement is not needed, and so that the resources for the refund settlement can be scheduled for when spare resources are available, thereby improving the overall throughput of a computing system.

Examples allow organizations to provide efficient transactions in a secure network. One implementation can involve an account security system receiving a checkout communication associated with a secure transaction, where the checkout communication is structured to include a first child merchant identifier associated with a first child merchant system, a second child merchant identifier associated with a second child merchant system, and a merchant identifier associated with a merchant system. The merchant identifier can be associated with the first child merchant identifier and the second child merchant identifier. In such an implementation, the first child merchant system and the second child merchant system are associated with different merchants. The merchant system can then be authenticated using the merchant identifier. The secure transaction can then proceed with facilitating processing of a first payment of the secure transaction, where processing is facilitated using the first child merchant identifier, and where processing is based on the authentication of the merchant system. A second payment can also be performed concurrently or after the first payment. The secure transaction can thus include facilitating processing of a second payment of the secure transaction, where processing is facilitated using the second child merchant identifier, and where processing is based on the authentication of the merchant system.

Some examples include structures to implement data security for client data used as part of a network transaction, and to manage merchant access to tokenized client data that protects client data security while facilitating transactions. In some merchant systems, for example, an independent structure for transaction authorization can be implemented, where a merchant may want to also offer secure validation of client accounts. Examples described herein include systems and methods that allow account number lookup and account number validation to be enabled within a merchant system while protecting client data from the merchant system. These data lookup operations can be done with a security system that validates the merchant system, and then interacts with a client system to perform lookup or validation for client data while maintaining client data security.

In one example, a data security system can be invoked via an interface element included in a merchant user interface. Selection of the interface element can be used as part of a secure transaction to allow a client to perform an account lookup operation or an account validation operation. In some such examples, selection of the associated interface element by a client device interacting with a merchant website causes a checkout communication to be initiated by a merchant system. When the checkout communication is received at an account security system that will facilitate the account lookup or verification as part of the secure transaction, the account security system initially uses the checkout communication to authenticate the merchant system (e.g. confirming that the checkout communication is from a validated checkout system).

The data security system can then generate a client token for the merchant system that can be sent to the client device to confirm that the merchant system has been validated. The client device can then open a modal (e.g. an interface overlay on top of the merchant website interface) that is used for a communication channel with the account security system. This modal allows the merchant website to maintain a consistent look, feel, and interface flow while isolating the merchant system from sensitive client data. The communication channel between the client device and the account security system can be used to transmit identifying client information to the account security system, so that the account security system can provide information for the secure transaction. Account security can include account lookup information, such as providing an account number to a client. Account security can also include account verification, including verifying an account number and providing account details such as an available balance. This account data can then be tokenized to provide security and to isolate the merchant system from the actual data. When the client device is done communicating with the account security system, the tokenized data is then available to be provided to a merchant system if requested by the merchant system for use in completing a secure transaction.

Such examples can be implemented with various methods in an account security system. In some examples, the account security system can perform additional operations including receiving a checkout communication associated with a secure transaction. As described above, an account security system can function where the checkout includes data describing a validated checkout system, and where, when the checkout communication is received from a merchant system, the checkout communication does not include client information. The account security system can then process the checkout communication to authenticate that the checkout communication is from the validated checkout system, and generate a client token in response to an authentication that the checkout communication is from the validated checkout system. The client token can then be transmitted, so that when the client token is received at the client device, the client token is used to verify the merchant system. The account security system then receives an account communication including the client token and client information (e.g. where the client information is not received from the merchant system), and generates a tokenized client account number in response to the account communication. The tokenized client account number is then transmitted for use in facilitating the secure transaction, where the tokenized client account number allows the merchant system to process the secure transaction without access to the client information.

If a refund is request for the secure transaction, the merchant system can use the same authentication system described above, along with any additional security or other security measures. After an authentication, the merchant can pass the tokenized client account number to the refund system. The refund system can perform various checks, including confirming the transaction is eligible for a reversal, identifying an account associated with a provided tokenized account number (e.g. a tokenized client account), and confirming a match between the authenticated merchant system and the account number.

If a batch processing operation is used, the above operations can be repeated for each transaction after an initial parent merchant authentication. In either the single transaction or batch process, a refund can be approved, rejected, or can fail due to an error (e.g. a data mismatch or formatting error).

Additional examples or variations can include further security operations to confirm the security of a client device, and to enable interactions with other systems as part of a secure transaction. The examples described above improve the operation of transaction communications systems and devices in such communication systems by improving device security and security of sensitive data within such devices and systems. Additionally, interfaces described herein improve both the operation of devices displaying such interfaces and communication systems used by such devices by improving the operation flow and reducing the number of user actions to perform operations as part of a secure transaction, as well as by enabling new functionality in system devices. The associated operations can occur in real-time (e.g., occurring immediately or nearly immediately within the context of communications that occur over a fixed amount of time, such as within 1 second) during a transaction to add security to transactions and associated real-time communications. Examples described herein improve the operation of devices and networks with improved security and privacy that can be added to existing devices and networks in real-time secure communication environments.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

The present disclosure is described in conjunction with the appended figures.

Figure 1:
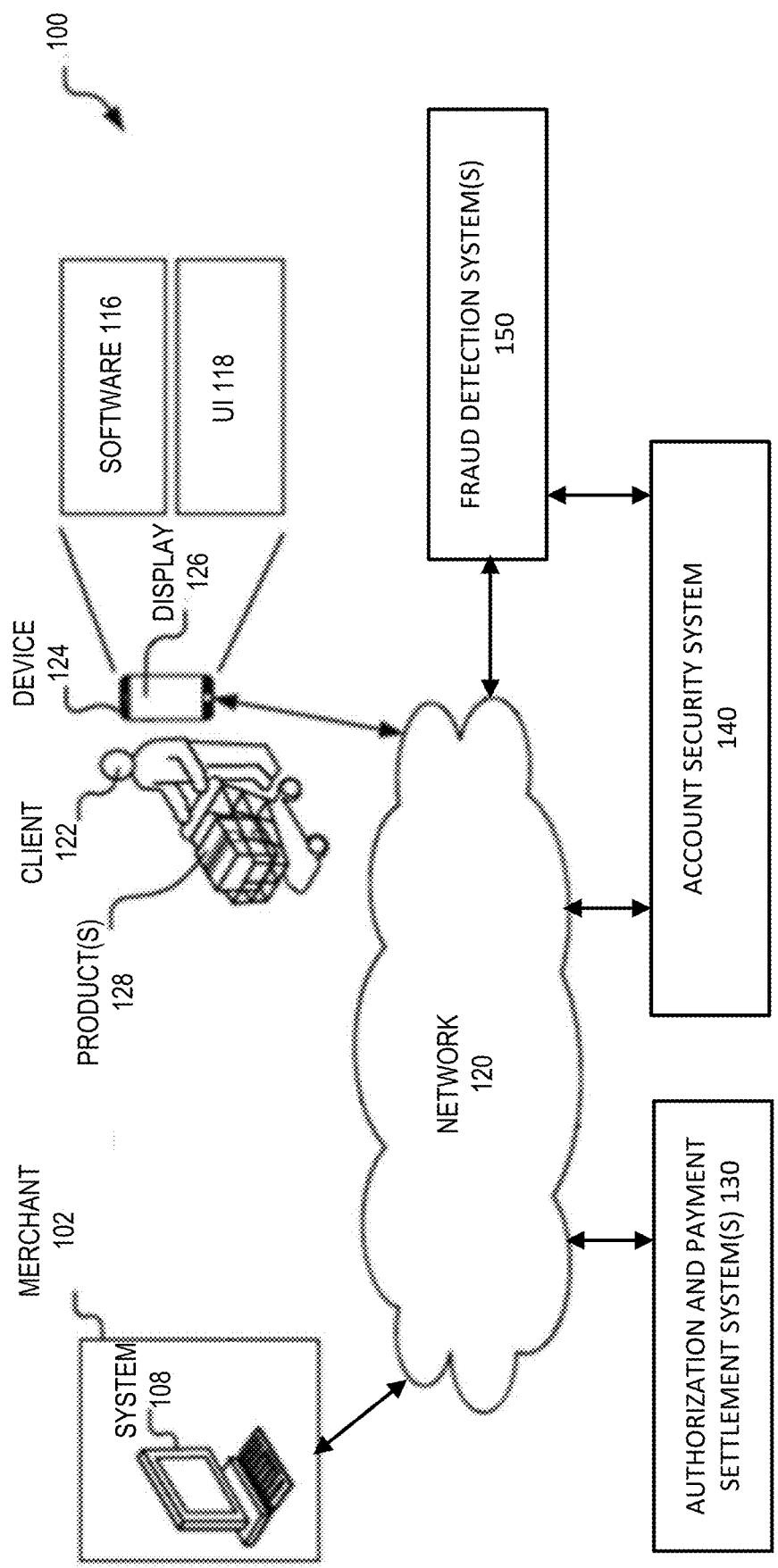
FIG. 1 depicts aspects of a system that can be used for data security and transaction management in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

In some transaction environments, in order to keep sensitive client data separate from merchant systems, aspects of a transaction system (e.g. a merchant website) can be structured using separate account security systems. Such structures can implement data security for a transaction using a tokenized account number to keep sensitive client data separate from merchant system. Such a tokenized account number prevents a merchant from independently refunding an account without the merchant having access to the account security system, since the merchant does not independently have the information to match the tokenized client account number to the actual account. The use of the same account security system with the transaction and the refund, however, enables shared authentication information to be used by the merchant for both the transaction and the refund. Additionally, the tokenized account number can be used by the account security system not only to identify the account, but also to identify a specific transaction if the tokenized account number is a one-time use number. The tokenized account number can thus replace a transaction identifier for transaction lookup operations in response to a refund request and as part of a transaction reversal. Examples described herein improve the security of a transaction communication system while improving the performance of devices in the system with a shared merchant authentication system and efficient security structures.

Additionally, as described above, some examples include further improvements in network and device operations with batch processing of transaction reversals. In some examples, such batch reversals can operate under a single parent merchant authentication, with a repeated loop for each transaction using a child merchant identifier that relies of the initial authentication for the parent merchant identifier. Such a system further improves the efficiency of a communication network while enabling transaction reversal functionality and system security. Additional details related to such examples are described below.

Such improvements, can, in some examples, operate in a modular website environment. This modular function can be implemented with a checkout button associated with an account security system to be added to a website. This button allows an interface for account lookup and verification to facilitate custom payment solutions selected by a merchant. The button is provided to client devices as part of a web page user interface from a merchant system. When a client interacting with a merchant website clicks the described modular button, various operations for account security are initiated. The merchant system responds to this selection by communicating with an account security system to authenticate the merchant system. The account security system can then return a client token and postback identifier if the merchant is authenticated. This response information can be used to initiate a modal on the client's device as part of the merchant website user interface. The modal can appear as integrated with the merchant website, but rather than using the existing channel between the client device and the merchant system, the modal uses a separate communication channel between the client device and the account security system. This channel allows the client to provide sensitive client information as part of client verification or account access (e.g. for account lookup or account verification operations). The account security system can then generate tokenized client data for use with the merchant. The tokenized client data keeps the regular client data secure and separate from the merchant system, while allowing the merchant system to perform operations for a secure transaction, so that the merchant can receive payment while only having access to secure (e.g. tokenized) client data that does not put the client's sensitive information at risk.

In addition to the operations described above, the initial modal and channel between the client device and the account security system can be initiated, in some examples, only after the client device has been determined to be secure (e.g. using a security analysis of the device). Additionally, other examples can add additional security operations, or can perform different operations for any number of accounts associated with clients. As the account security system is modular and independent of other operations for a secure transaction, after the account validation is performed and the tokenized client data is generated, the merchant device can interact with separate independent systems to finalize and settle the secure transaction. In various examples, the account security system may communicate with such independent systems to facilitate the use of the tokenized data. The authentication tokens and the tokenized client data can then be used in transaction reversal operations. Details of selected examples are below, though it will be apparent that additional implementations are possible other than the specific examples provided.

FIG. 1 is a block diagram of a payment communication network 100 in which network data management and security for transactions is implemented in accordance with some examples. The example payment communication network 100 includes a merchant 102 implementing a merchant system 108, which can be one or more networked computing devices that can be networked. Merchant system 108 can include any number of devices (e.g. a checkout register, point of sale (POS) devices, or any other such device) as well as server systems and computers that implement a website that can be used to perform secure transactions over a network 120. The merchant system 108 and associated website can be implemented as a computing device with architecture 1000 described below and illustrated in FIG. 10.

Referring to FIG. 1, the merchant system 108 is configured to perform operations associated with a purchase transaction for a client 122 and a product 128. In some examples, a client can use a client device 124 (e.g., a cellular telephone, laptop computer, a desktop computer, etc.) associated with a client account to interact with merchant system 108 as part of a secure transaction. Some examples of a client device 124 can include a display device 126 (e.g., a conventional touch screen) and wireless or wired network connections to network 120. The client device 124 includes software 116 that can additionally cause display of user interfaces 118 on display device 126 in accordance with various examples. This can include, as described herein, web browser software as part of software 116 that can display a user interface using data received from a website of merchant system 108.

A client 122 may select one or more products 128 for purchase via interface(s) of the merchant's website. When the client device 124 interacts with the merchant system 108 via a website interface, the merchant system 108 can use a payment channel based on the particular client device 124 and options selected by client 122.

The merchant system 108 generates and communicates an authorization request message with authorization and payment settlement system(s) 130 as part of a secure transaction. The authorization request message can be routed to an authorization system, with the authorization system 130 processing the authorization request message to generate an authorization response.

An authorization entity can operate one or more authorization computing devices as part of an authorization system 130 configured as part of a payment communication network 100.

The authorization system 130 can include various subsystems or component functions implemented on processors of the authorization system to enable authorization of payment transactions between client 122 and merchant 102. The authorization system 130 can include validation and fraud systems as well as a promotion system. These systems can be systems that operate in addition to similar systems of account security system 140 or independent fraud detection system 150. Validation and fraud systems of system 130 can include computing systems for validating card numbers from client device 124 to confirm that credit or payment funds are available to match the purchase amount associated with a transaction being authorized. Additional fraud analysis operations can analyze and process information associated with any aspect of a transaction to approve or deny an authorization request.

In addition to the systems described above, an authorization system can in various implementations, include additional systems for security, fraud detection, and other functionalities. Some implementations can include a token service that can act in a number of ways to facilitate secure communications between client 122 and various other services and devices, including retail merchant system 108 and other systems. Tokenization is a process of substituting sensitive data elements with non-sensitive equivalents (e.g. tokens). The token is a reference identifier that can be mapped to the sensitive data via token service. Such a token service can use large random number in combination with other systems, such as timing systems, to limit and secure the use of sensitive data being communicated over networks such as networks 120. The tokens (e.g., tokenized client account numbers) can be automatically generated in real-time or near real-time, and such automatic operations can be performed thousands of times per second or more in accordance with examples described herein. Similarly, data for thousands or tens of thousands of transactions can be stored in a memory or associated database of a device to be available for real-time access during secure transactions as described herein.

As described above, in some examples, authorization system 130 can be integrated with other systems, such as a credit issuing system and communication channels with a client 122 outside the authorization channels used to communicate authorization request messages and responses between merchant devices and devices of an authorization system (e.g. authorization system 130). In such a system various additional functionality can be integrated for security and payment systems improvements, such as the use of token services as described above. Additionally, while FIG. 1 illustrates communications between various systems and devices, including merchant system 108, client device 124, authorization system 130, account security system 140, fraud detection system 150, and network 120, in additional examples, other aspects of payment communication network 100 can further be altered or include additional or intervening elements, such as multiple clients, clients with shared accounts and devices, additional merchant or retailer systems, subsystems that can operate independently, additional communication channels, or other such structures.

Fraud detection system(s) 150 can include any independent service or system that can be used by account security system 140 or authorization system 130 to supplement or support fraud or security systems. For example, fraud detection system 150 can include systems for detecting if a computer of merchant system 108 or a user device 124 has been compromised by malicious software or other security risks. Fraud detection as described herein can include the use of independent data identifying such issues, as well as communications and analysis operations performed with such devices before they are allowed to participate in secure transactions with account security system 140 and/or authorization system 130. Additional examples can include other such security and fraud detection schemes to support the implementation of secure transactions as described herein. Additional details of an account security system 140 are described below, and in various examples, fraud detection system(s) 150 can be implemented with varying degrees of integration with an account security system 140.

Figure 2:
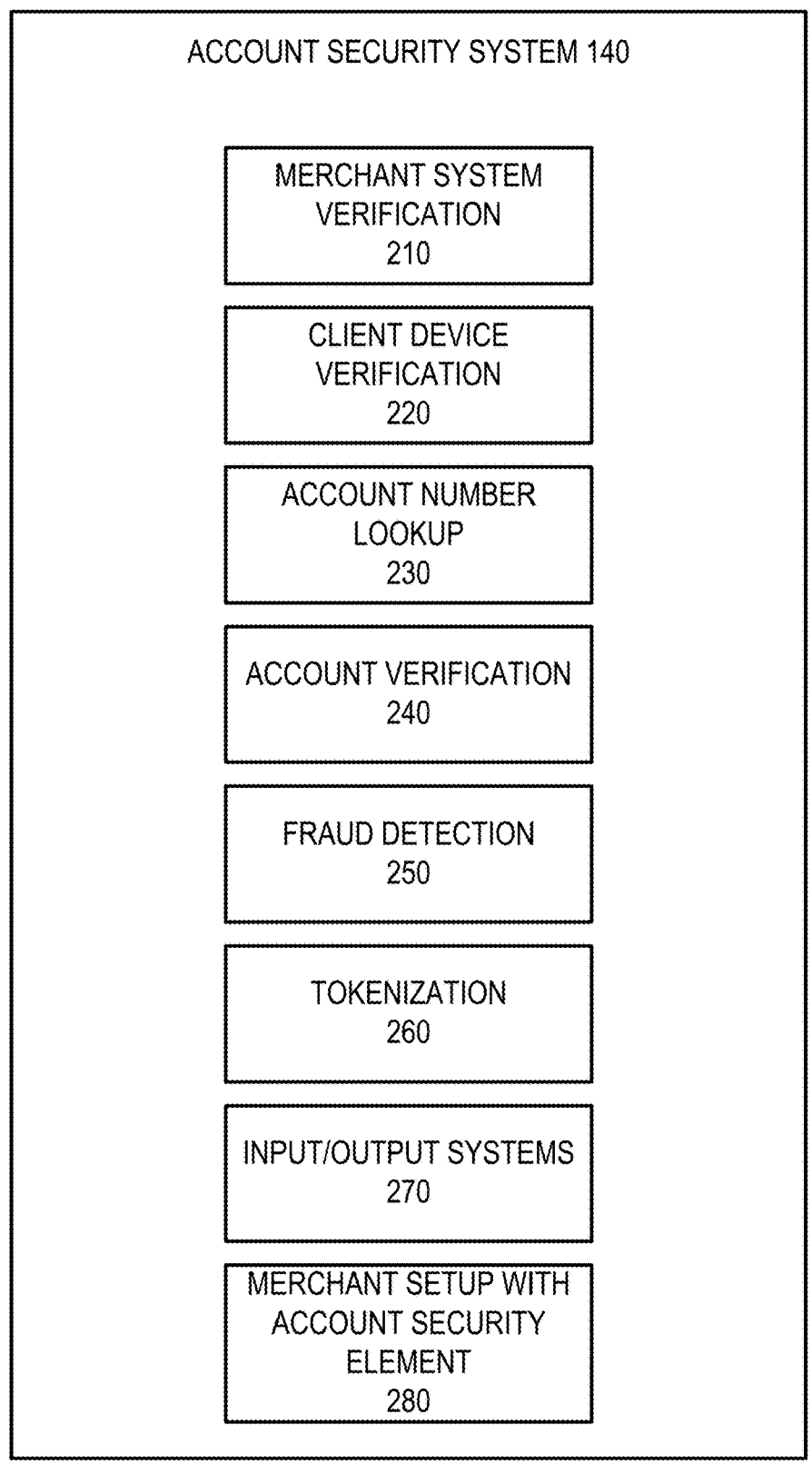
FIG. 2 depicts aspects of an account security system for implementing data security and transaction management in accordance with some examples.

FIG. 2 depicts aspects of an example account security system 140, which can be used within a payment communication network 100 or other systems to implement data security as described herein. Account security system includes a number of different elements that can be implemented as modules or different devices networked to implement various security functions. Account security system can be implemented as a single server, or as a distributed system using multiple networked devices. Input/output systems 270 can manage transmission of data and receipt of data both between different elements of the system 140 as well as with other devices, such as merchant servers and client devices, using any suitable network and communication components, such as those described below with respect to FIG. 10. The described elements of account security system 140 include merchant system verification 210, client device verification 220, account number lookup 230, account verification, fraud detection 250, and input/output systems 270. In other examples, these elements can be grouped in a variety of different ways. For example, client device verification 220 and fraud detection 250 can, in some examples, be structured as a single sub-system, or can be largely implemented as a separate system (e.g. using separate fraud detection system(s) 150). In various examples described below, the elements of account security system perform different parts of the operations to implement security as part of a secure transaction that uses modular elements to add to the security of larger systems.

Merchant system verification 210 interacts with merchant systems such as merchant system 108 to authenticate that the merchant is safe for a user to perform a transaction with. This verification can be done using security measures such as using security keys, transaction history data, merchant registration, and other verification tools. Merchant system verification 210 can create tokens that can be used as part of a secure transaction to allow participants in the transaction to confirm that they are interacting with verified participants that have met security standards and have access to the token generated by merchant system verification 210 for a specific transaction.

Client device verification 220 can include security operations to check for issues with a client's device, such as malicious software installed on a client device, a history of questionable transactions or fraud associated with a specific device, or other operations. This verification can be implemented via communication with a specific client device, accessing database data with fraud history data, or requiring installation of software on a client device to check for security issues with a client device. In some examples, merchant system verification 210 operations and client device verification 220 operations can be used as gateways for additional sub-systems, such that merchant systems and client devices are not allowed access or use of additional systems such as account number lookup 230 and account verification 240 unless the threshold requirements of merchant system verification 210 and client device verification 220 have been met.

Account number lookup 230 and account verification 240 interact with client devices to receive client data and access sensitive client account information. These operations can, for example, include receiving information such as an address, phone number, government identifier, or other such information, and using this information to access an account number associated with a client credit account. The client credit account number can then be provided to the client device or tokenization 260 element with an authorization to use the credit account with a specific secure transaction (e.g. a transaction associated with a client token generated by merchant system verification 210.) Similarly, account verification 240 can accept a client account number associated with the client credit account, and provide information such as an available balance to allow a client to confirm that the available balance is sufficient for a current secure transaction. The operations of account verification 240 and account number lookup 230 can be associated with a particular transaction, and used to trigger generation of tokenized client data by tokenization 260 element. This tokenization can involve generation of a one-time set of data that can be used only for a specific transaction. In some examples, after the tokenized client data is generated in response to account security system interacting with a client device, the tokenized client data is then stored until it is requested by the merchant system associated with the secure transaction, or until a deletion event occurs. Such deletion events can include a threshold amount of time, a number of incorrect requests for data associated with the client device or the client account, or other such events. If a deletion event occurs, a subsequent request for the data by the verified merchant can be met with a response indicating that the data has expired and the secure transaction is to be restarted (e.g. a new secure transaction initiated and the original transaction abandoned.)

Merchant setup with account security element 280 refers to systems used to integrate account security system 140 with associated merchant systems. This can include data intake and reporting systems, systems for confirming a particular website meets any limitations or technical requirements for accessing and integrating an account security system 140, and customization of an account security element to be used by a particular merchant website. Additional details for an example implementation of a merchant setup with account security element 280 module are described below with respect to FIG. 3.

Throughout operations for data security described herein, fraud detection 250 can monitor data and generate alerts or halt operations for a specific transaction when a risk of fraud is identified.

Figure 3:
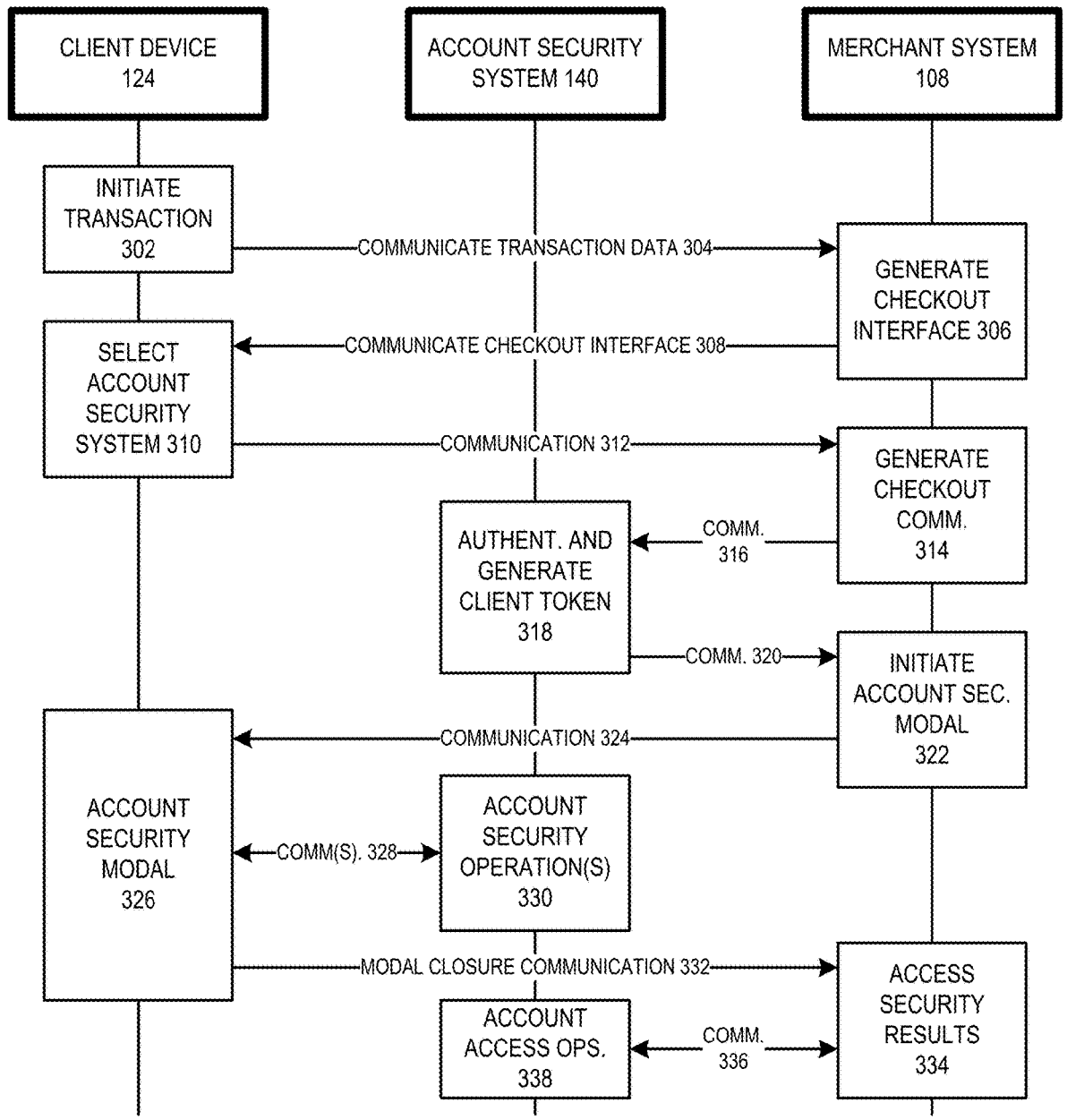
FIG. 3 depicts aspects of a system and system operations for data security and transaction management in accordance with some examples.
Figure 4:
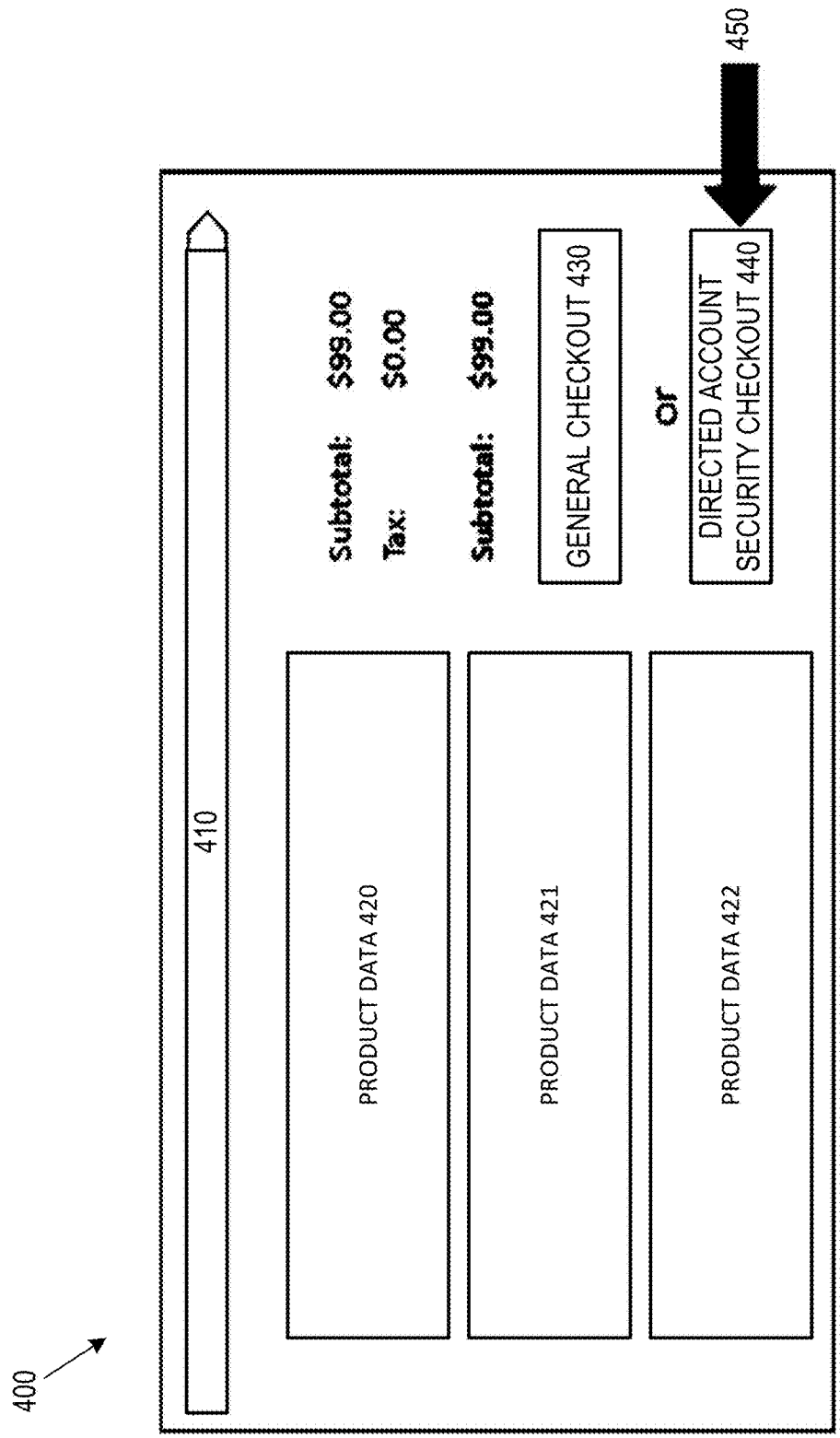
FIG. 4 depicts aspects of a system and user interfaces for data security and transaction management in accordance with some examples.
Figure 5:
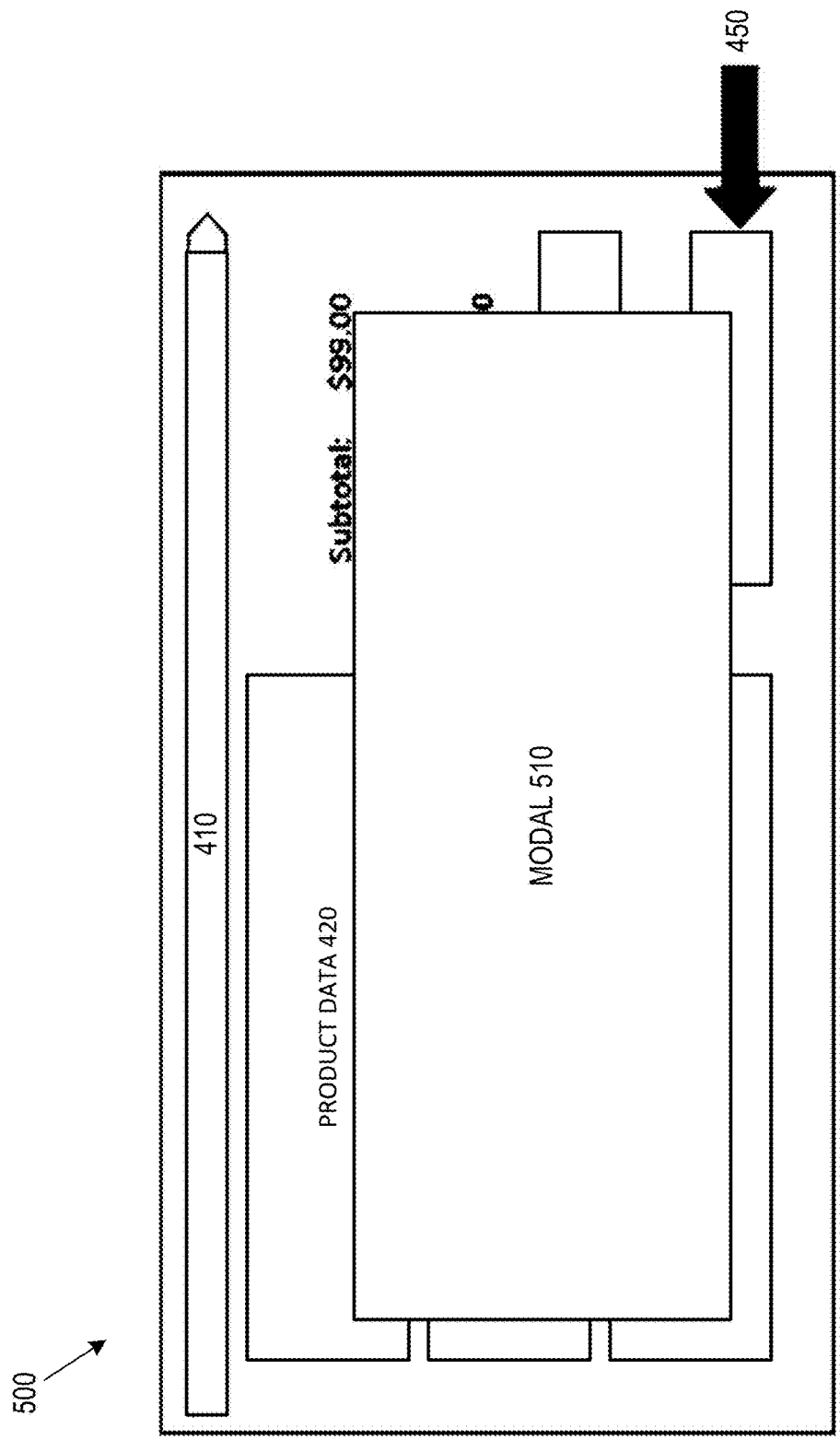
FIG. 5 depicts aspects of a system and user interfaces for data security and transaction management in accordance with some examples.

FIGS. 3-5 then describe an implementation of a secure transaction with data securing and a modular website implementation in accordance with some examples. FIGS. 4 and 5 illustrate aspects a modular website with an interface that can be displayed on a client device (e.g. client device 124) as part of data security operations for aspects of a secure transaction illustrated by FIG. 3.

FIG. 4 illustrates a user interface 400 with a transaction flow indicator 410, and product data 420, 421, and 422 for one or more products (e.g. product 128) that has been selected for purchase using a merchant website (e.g. as part of merchant system 108 of merchant 102). The user interface 400 includes a general checkout 430 interface element that can initiate payment operations using a general settlement system, or can used directed account security checkout 440 element. The directed account security checkout 440 interface element is a modular interface element that can be added to a website of a merchant in order to initiate data securing operations via an account security system in accordance with examples described herein. When a selection 450 of directed account security checkout 440 element occurs, a modal is launched to initiate a communication channel with an account security system (e.g. account security system 140), as illustrated by FIG. 5.

FIG. 5 shows a user interface 500 with modal 510 overlaying user interface 400. User interface 400 can be communicated to a client device from a merchant system, with various interactions with a merchant website leading to interface 400 being displayed on a screen of the user device. When selection 450 initiates modal 510, the modal 510 does not communicate via a merchant system, but establishes a communication channel with an account security system to keep sensitive client data separate from the merchant system. The modal 510 can then accept sensitive client data such as phone numbers, addresses, client identifiers, account numbers, and other such information. This information is kept separate from the merchant system, while the modal 510 allows modular integration of this independent data security structure (e.g. communications with data security system) within the context and user interface flow of the merchant website. Additional aspects of such interfaces are described below in the context of the examples shown in FIGS. 3 and 6.

FIG. 3 illustrates system operations and communications for data security as part of a secure transaction involving client device 124, account security system 140, and merchant system 108. In order for merchant system 108 to integrate account security system 140 into transactions involving merchant system 108 and customers of merchant system 108 (e.g. client device 124 using a merchant website of merchant system 108), merchant system 108 is configured with software elements to allow such integration. This can include a modular button integrated with a merchant website, and additional software elements included with a merchant website that enable a modal to be opened on client device 124 for a secure connection between client device 124 and account security system 140. This can also include additional software elements to allow account security system 140 to interact directly with account security system 140 (e.g. to access data, results of credit operations performed between client device 124 and account security system 140, etc.) Systems to manage this integration between account security system 140 and merchant system 108 can be structured as described above (e.g. as a merchant setup with account security element 280 for onboarding any merchant system with account security system 140).

Prior to operation 302, the merchant system 108 is on boarded with account security system 140, and the merchant website integrates account security elements from the account security system 140. When client device 124 interacts with merchant system 108, the merchant system 108 sends website data to the client device 124 device, including a client portion of the account security element (e.g. including a modular button and additional routes for the modal and any other associated functions supporting account security system 140). A user of client device 124 selects items for a transaction as part of interactions with the website of merchant system 108.

In operation 302, client device selects products for purchase as part of a secure transaction, and initiates the secure transaction (e.g. via a process to checkout selection of a user interface). Communication 304 informs merchant system 108 of the client device 124 selection, and in response, merchant system generates a checkout interface (e.g. interface 400) in operation 306. The checkout interface includes a modular button, such as directed account security checkout 440 element of FIG. 4, and the data for the user interface is communicated from merchant system 108 to client device 124 in communication 308. In operation 310, the client device receives a selection for the account security system (e.g. selection 450), and this selection is communicated to merchant system 108 in communication 312.

The merchant system 108 receives an indication of the selection for the account security system in operation 314, and generates a checkout communication in operation 314, that is sent to account security system 140 in communication 316. In response to the checkout communication, account security system operation 318 authenticates merchant system 108 to confirm that the merchant system is secure and has been validated. The account security system generates a client token when the authentication is confirmed, and communicates the client token to merchant system 108 in communication 320. In some examples, the client token can be communicated with a postback identifier to allow tracking of the communications for the secure transaction, and to allow management of different transactions with different client devices and merchant systems that can continuously be interacting with account security system 140 to provide data security for secure transactions.

Merchant system 108 uses the client token from account security system to initiate the account security modal in operation 322 with communication 324, which can include the use of the client token in communication 324 that, when received by client device 124, allows the client device to perform security measures to confirm that merchant system 108 is a secure system and can safely perform the secure transaction. In operation 326, client device 124 opens a modal (e.g. modal 510 of user interface 500. From a client perspective, the modal opens in response to a user interface selection (e.g. selection 450), and appears as part of an interface for the merchant system 108 website. As described above, the modal opened in operation 326 is used with a communication channel established between client device 124 and account security system 140 for communications 328. Communications 328 for operations 326 and 330 can operate for various security operations, which can include operations to confirm that client device 124 is not presenting indications of a virus or security compromises, and can also include other fraud detection operations. Once such security operations are used as a gate to account access, the client device 124 can further provide sensitive client data to account security system 140 to perform operations in a secure environment as part of operations 326 and 330, including account number lookup and account verification operations. During the account security system 140 portion of these functions in operations 330, tokenized client data can be generated in response to data and interface selections provided via the modal on client device 124. The tokenized client data can be stored at account security system 140 until requested by the merchant system in operations 334.

Processing of communications as part of a secure transaction and associated generation of the tokens and additional communications to facilitate modal presentation can occur in real-time or near real-time (e.g., limited by processing and network speeds and latency), such that computing devices facilitating communications and security operations automatically perform operations and provide information within a transaction that occurs within a brief time period (e.g., less than 0.1 seconds in some environments, less than 1 second in some environments, or less than 3 seconds in some environments). The near real-time operations and communications allows an account security system 140 to operate between a parent merchant system 107 and a client device 124 while minimally degrading the near real-time nature of communications for a transaction between client device 124 and parent merchant system 107, and improving device and system operation with added privacy and security. Further, in some implementations of real-time automatic operation, multiple instances of operations described above can occur simultaneously. For example, operation 306 for one transaction can occur simultaneously with any or every other operation of FIG. 3 for other transactions. Similarly, a single device implementing an account security system 140 can automatically perform multiple instances of each of operations 318, 330, and 338 for different transactions at the same time.

The modal of operations 326 can, in some examples, close without the client device providing adequate information for the client to access account data or for tokenized client data to be generated. In such a circumstance, the client device can proceed with the transaction using a separate system (e.g. returning to interface 400 and selecting the general checkout 430 user interface element). Data associated with this failure can be logged and used to check against future fraud indications.

When the modal does provide sufficient client data to account security system 140, closure of the modal on client device 124 can be considered the end of operations 326, and this closure can be communicated to merchant system 108 in communication 332. The closure causes merchant system 108 to request the security results from account security system in operation 334 using communications 336, which result in account security system responding with the tokenized client data in operations 338 and responsive communications 336.

In some examples, upon providing the tokenized client data, the independent modular data security operations provided by account security system 140 can be considered complete. Remaining payment and settlement operations can then be performed with a separate settlement system 130. As described above, tokenized client data can be automatically generated in real-time or near real-time, and such automatic operations can be performed thousands of times per second or more in accordance with examples described herein. Similarly, data for thousands or tens of thousands of transactions can be stored in a memory or associated database of a device to be available for real-time access during secure transactions as described herein.

Further, in various implementations, any other communications and operations of FIG. 3 can be performed in real-time or near real time. For example, communications between client device 124, account security system 140, and parent merchant system 107 (or any other merchant system) can occur in real-time or near real-time (e.g., as limited by processing speeds and latency in the devices and network) to provide a seamless user interface presentation as part of a transaction with merchant system 108. Additionally such communications and operations for a given transaction can occur simultaneously with communications and operations for other transactions, such that simultaneous real-time operations can be performed by a device or system for many transactions.

Figure 6:
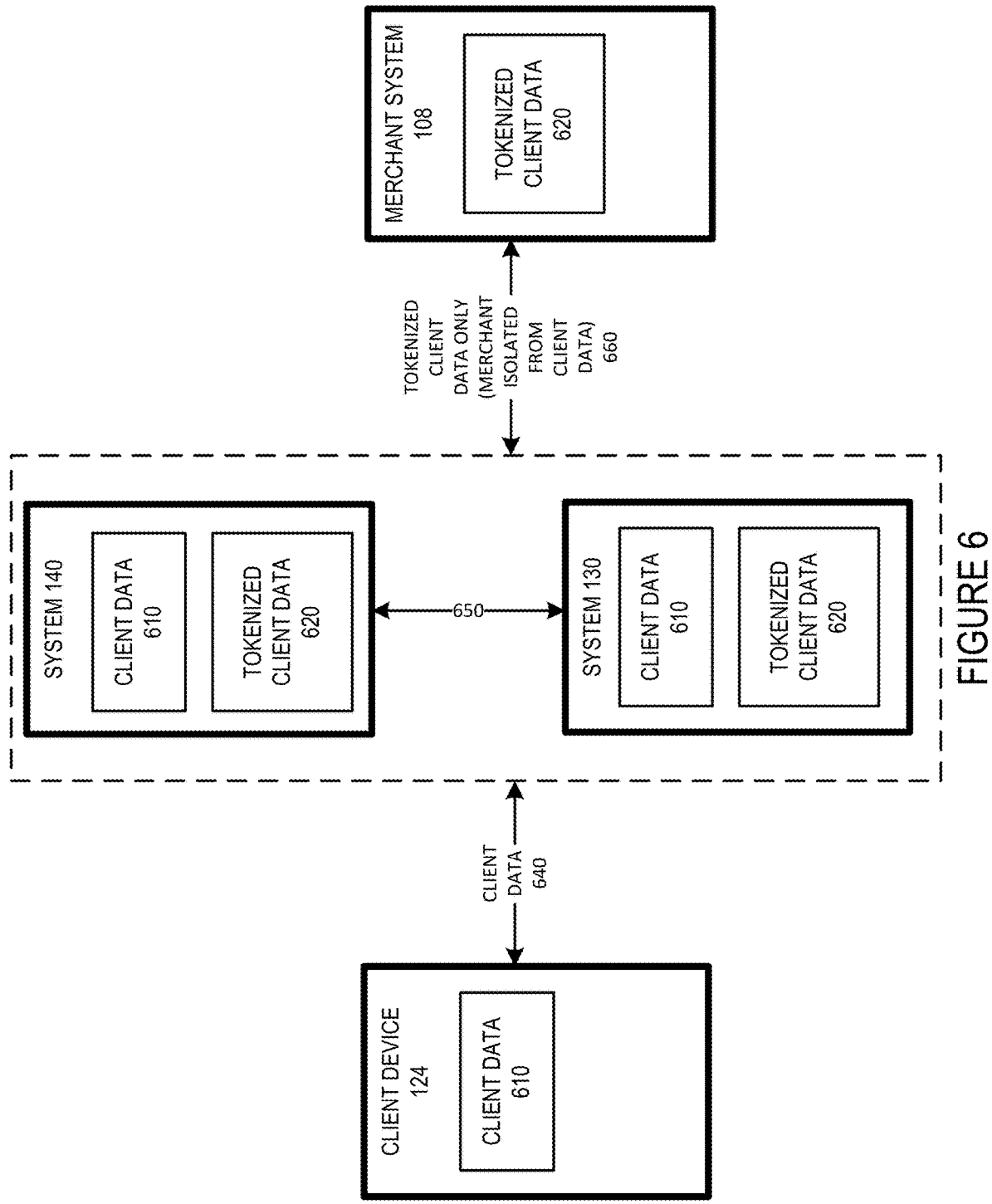
FIG. 6 depicts aspects of a system and system operations for data security and transaction management in accordance with some examples.

FIG. 6 depicts aspects of a system and system operations for data security and transaction management in accordance with some examples. As illustrated, client device 124 can include client data 610 provided by a client or user of the client device 124. In the secure transaction illustrated above and in additional examples, communication of client data in communications 640 occurs with account security system 140 and may occur with authorization and payment settlement system 130, so that systems 130 and 140 can both have access to sensitive client data 610. The merchant system 108, however, is isolated from this client data 610, so that merchant system 108 only receives tokenized client data 620 in communication(s) 660. This tokenized data received by merchant system 108 is secure, so that the tokenized data does not allow merchant system 108 access to or sensitive information associated with the client data used to generate the tokenized data. As described above, the tokenized client data 620 is generated in system 140, and is generated to obscure the actual client data, while allowing the merchant system to interact with systems 130 and 140 to facilitate payment. Various data can be shared with an authorization and payment settlement system 130 in communications 650 to allow the use of the tokenized client data in authorizing payments for the secure transaction. In other examples, communications 650 do not include specific tokenized client data, but other data can be shared that facilitates system 130 accepting the tokenized client data 620 from merchant system 108 as part of a secure transaction.

The use of account security system 140 in addition to authorization and payment settlement system 130 provides benefits to a system in which merchant system 108 and system 130 have fixed structures or implementations that would require significant resources or changes to implement the account lookup and account verification features between merchant system 108 and system 130. The use of account security system 140 enables such functionality with minor modular user interface changes by merchant system 108 website implementations, so that the security of the system 130 and merchant system 108 communications is improved without these systems needing to be replaced.

The isolation described above to keep merchant system 108 from storing sensitive client information, such as an account number, extends to transaction reversal (e.g. refund) systems. In the above described system, if a client requests a refund for a transaction, the merchant system will not have a record of the account number for an account that a refund will be settled to.

Because of this, a client is not able, in such systems, to use an account number in requesting a refund or in such related operations. Instead, other information, can be used to identify the transaction. As described above, since the tokenized account number can, in some systems, be unique to a specific transaction, the tokenized account number can be used in such systems to identify the transaction when a refund is requested. In other examples, other information, such as a combination of one or more data elements including a channel identifier, a transaction identifier, a merchant number, a promotion code, a transaction amount, a transaction description, a security code, an expiration, an address, and a partner code, can be used in identifying a specific transaction. Depending on the particular account security structures, sensitive client data (e.g. as defined by a particular system) is excluded from this data, as the merchant will not have access to this information in identifying a transaction. The information the merchant does have (e.g. data that is not considered sensitive client data) can be used in performing transaction reversal operations as described in more detail below.

Figure 7:
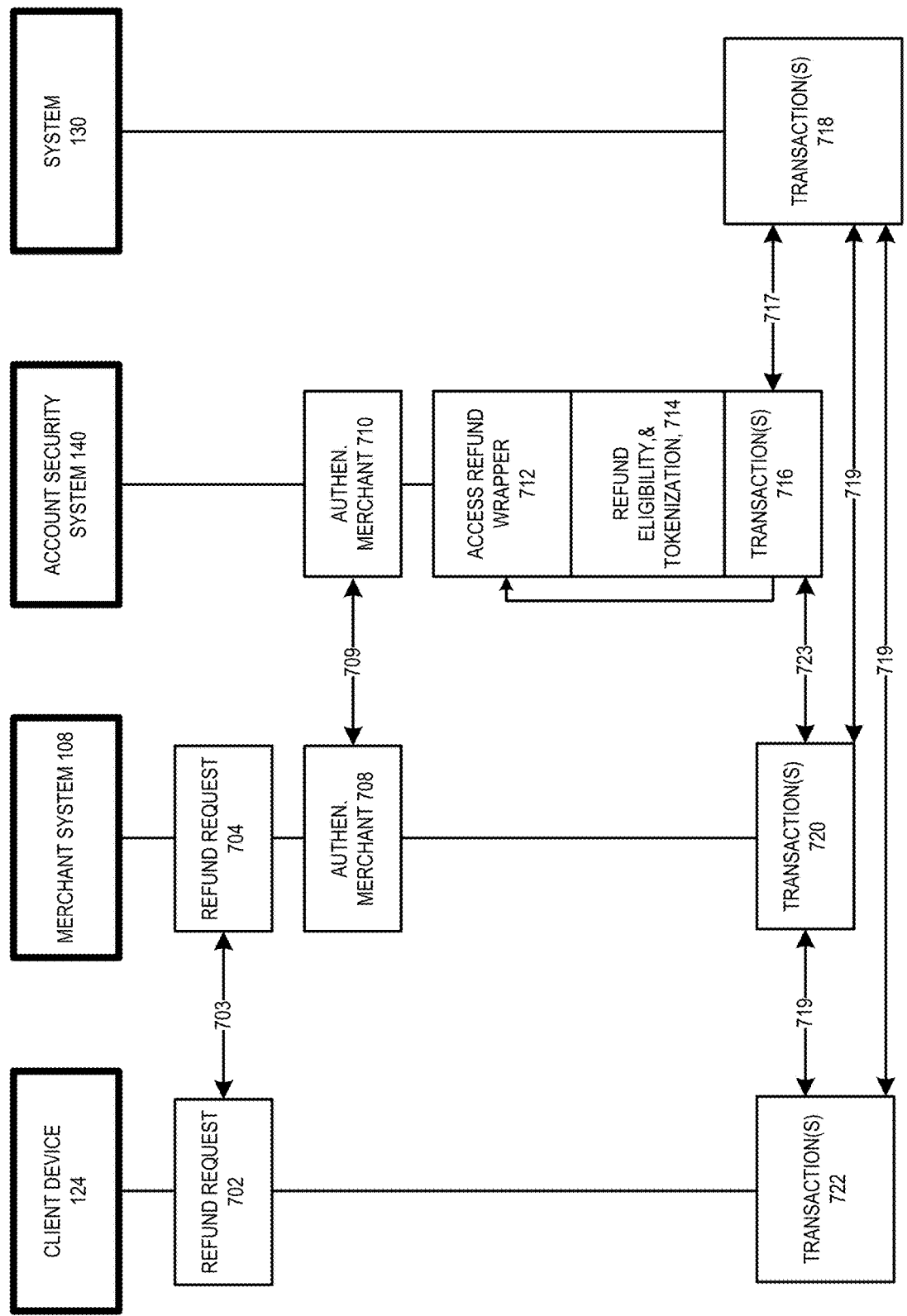
FIG. 7 depicts aspects of a system and system operations for data security and transaction management in accordance with some examples.

FIG. 7 then illustrates system operations and communications for data security as part of a secure transaction reversal (e.g. refund) involving client device 124, account security system 140, and merchant system 108. This can be the same system used above in FIG. 3, and so the integration of account security system 140 into transactions involving merchant system 108 and customers of merchant system 108 can also involve configuring a refund system so that merchant authentication structures (e.g. merchant identifiers, passwords, secure communication procedures, etc.) can be used for transaction reversal operations as well as the initial transaction. This allows for a seamless and efficient merchant integration of refund operations with security systems used to secure client data as part of a communication network for secure transactions. Systems to manage this integration between account security system 140 and merchant system 108 can be structured as described above (e.g. as a merchant setup with account security element 280 for onboarding any merchant system with account security system 140).

Prior to operation 702, the merchant system 108 is on boarded with account security system 140, and the merchant website integrates account security elements from the account security system 140. Just as for the initial transaction, this can include integration for a refund request, such as including a refund security element (e.g. including a modular button for the merchant website for refund initiation).

In operation 702, a user of client device 124 initiates a refund request operation 702. As part of the refund request operation 702, the client device 124 will interaction with merchant system 108 in communications 703 to identify the previous secure transaction that the refund (e.g. reversal) is being request for. The corresponding refund request operation 704 at merchant system 108 can request additional information from client device 124, or can access a local database for additional information related to the secure transaction. Communications 703 can thus include back and forth communications between client device 124 and merchant system 108. These communications can confirm the refund, notify client device 124 of details of the reversal, including any terms or limitations associated with the reversal, such as the loss of promotions associated with the secure transaction, or other such information. Once the refund request operations are finalized, the merchant system 108 then proceeds to initiate the refund through account security system 140 for refunds to be settled using system 130.

As part of the refund initiation following the initiating refund request operations 702 and 704, the merchant system 108 is authenticated with account security system 140 in merchant authentication operations 708 and 710 using communications 709. The authentication operations can use the same systems for authentication used in the initial transaction (e.g. as illustrated by FIG. 3), such as a merchant identifier and merchant password. In various implementations, any additional layers of security and authentication can be performed as part of or in addition to the described merchant authentication. This can include security checks associated with client device 124 to check for indicators that client device 124 has been compromised or is being spoofed. This can also include secondary checks to indicate tiers of security, such as refund history, recent account activity, multi-factor authentication for either a client or merchant based on history data or machine learning patterns for loss prevention, or other such systems.

When the merchant authentication operations 708 and 710 are complete, the account security system 140 processes data from the refund request and any associated information from client device 124 and merchant system 140 in processing the refund wrapper in operation 712. In some examples, a refund request can aggregate multiple refund requests for multiple transactions, resulting in an automatic looped process relying on a single merchant authentication. In other examples, only a single transaction is processed at a time. For each individual transaction, within the aggregated set, the refund processing steps are performed automatically without individual authentication, since each individual refund process is performed under the shared authentication. For each refund, these automatic operations can include an eligibility check, any associated tokenization for the transaction managed to identify the actual account associated with payment and settlement, and additional security and process checks performed with the actual account number in refund eligibility and tokenization operations 714.

Following the processing and security checks of the above operations, account security system 140 then communicates with system 130 to initiate settlement and refund of the payment for the secure transaction in transaction operations 716 and 718. This includes communication 717 which can include the account number for the client account used to make the payment. System 130 can then manage the refund with merchant account(s) and client account(s) to detect any appropriate amount from the merchant accounts and return any appropriate amount to the client accounts. In some systems, the transaction operations 718, 720, and 722 and associated communications 719 can be integrated with dispute resolution operations, confirmation data associated with a refund and eligibility criteria, or other such operations. This can include status check communications 723 for a merchant system 108 to check a refund status with account security system 140 as part of transaction operations 716. In such a system, the account security system is used to initiate the refund procedures with system 130 when a tokenized account number is used for a secure transaction, and detailed refund verification, transaction disputes associated with a refund request, and final decisions on settling disputed aspects of a transaction and transaction reversal are handled via system 130 communicating with merchant system 108 and client device 124, or other devices associated with a user of an account involved in a transaction and the merchant associated with the transaction. The system 130 can communicate with merchant system 108 using refund identifiers, the tokenized account number used for the secure transaction, or other identifiers while maintaining the established data security to keep sensitive client data isolated from merchant system 108.

At any time following transaction operations 716, account security system 140 can inform merchant system 108 of a status of transaction operations 716 in communication 723 to let merchant system 108 know that the appropriate account and transaction refund information has been communicated to system 130 for system 130 to perform settlement transactions with the parties. In some systems, such communications 723 can be performed automatically in response to account security system 140 completing a loop of refund processing operations for a refund wrapper of a refund request communication, or can be performed automatically based on a timed communication schedule managed by merchant system 108.

Figure 8:
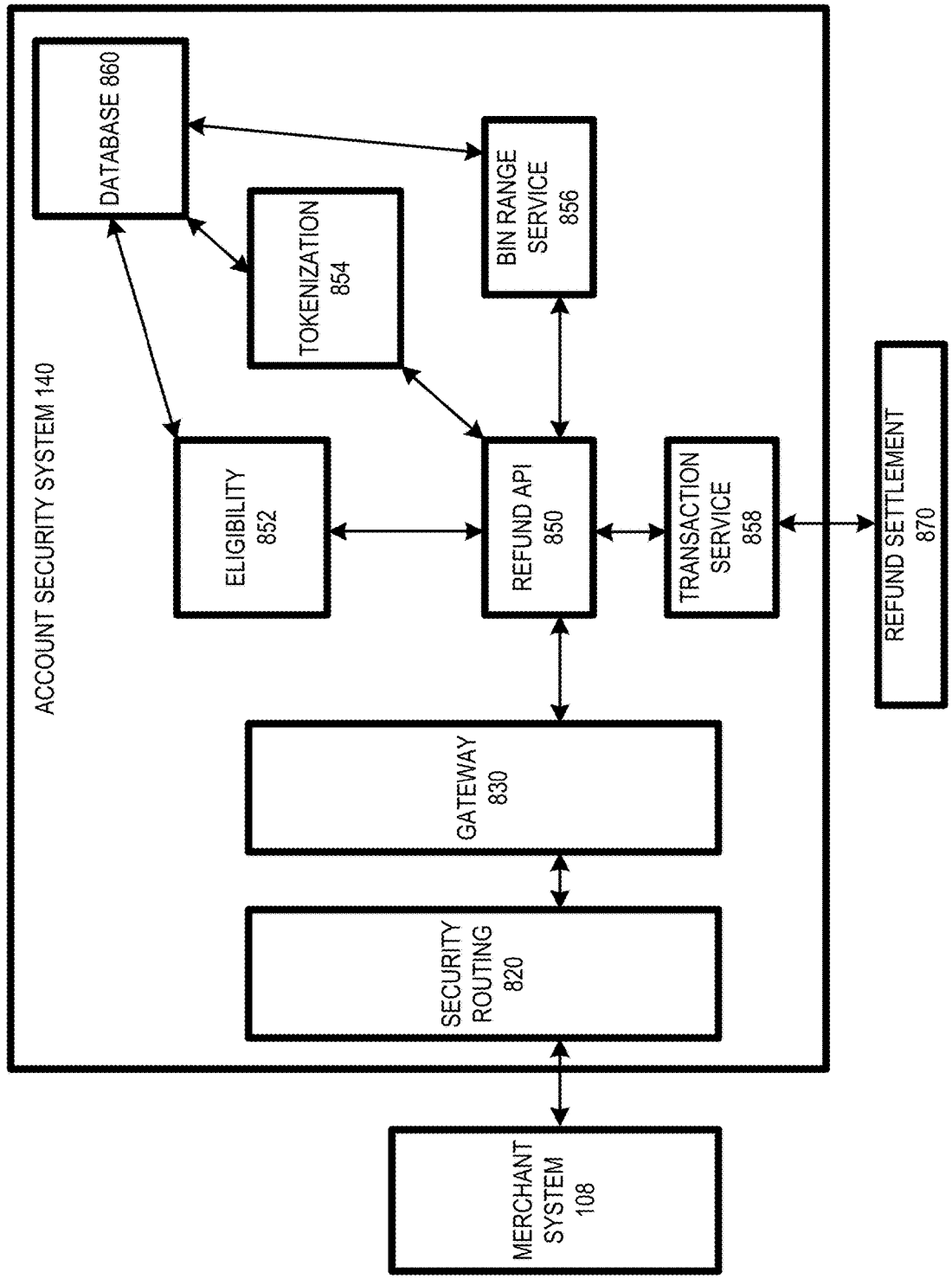
FIG. 8 depicts aspects of a system and system operations for data security and transaction management in accordance with some examples.

FIG. 8 then illustrates aspects of an example account security system 140 for processing refund data as part of account security for a secure transaction reversal. FIG. 8 includes a merchant system 108 interacting with aspects of an account security system 140 for refund processing. As illustrated by FIG. 8, merchant system 108 communicates with account security system 140 via multiple security layers, shown as security routing 820 and gateway 830. The security routing system can be an integrated network or a third party network for managing communications and routing those communications to secure servers that store sensitive client information. The gateway 830 system can be a third part system that implements systems for filtering improper communications and denial of service attacks. This can include initial formatting checks on incoming data or other such initial security checks. This can also include checking incoming traffic against previous communications or known communication sources that are unlikely to be sources of client data. These routing, proxy validation, and data validation systems can, in some implementations, be integrated with the other elements of account security system 140, or in other implementations, can be implemented separately or as third party services integrated with account security system 140.

After data for a valid refund request makes it through security routing 820 and gateway 830, a refund application programming interface (API) 850 service manages account security system 140 operations to enable the desired refund settlement 870 operations. In some examples, the refund settlement 870 operations are performed by or in conjunction with a separate settlement system 130 as described above in FIG. 7. The example account security system routes the refund request from merchant system 108 through a series of systems prior to the request proceeding to refund settlement 870 operations. Throughout these operations, at least one database 860 is used to check data associated with the requested refund. The database can be a secure database integrated not only with the illustrated elements of account security system 140, but with additional elements such as any element of FIG. 2. Database 860 can thus store information for merchant identifiers, merchant passcodes, merchant procedures and data checks for operations such as transaction refunds, tokenization data, account numbers and ranges, and other such data.

As an initial operation, the refund API 850 is used for eligibility 852 checks for a refund. This can include confirming merchant enrollment in refund systems through account security system 140. This can also further include status checks on data supporting refund operations for a particular merchant system, including merchant system 108. If the valid refund request is determined by eligibility 852 system to not be eligible, the refund request is rejected and a communication can be sent to merchant system 108 providing a reason for the rejection. This can include a promotion with a no-refund element. This can include an expired time limit for refund requests. This can include an issue with data in database 860 not identifying the particular transaction data provided by merchant system 108 as associated with a transaction or as associated with a transaction that is eligible for a refund. In some instances that can result from corrupted data (e.g. improper digits in a tokenized account number) or from a validly formatted request that does not include data that is found in database 860 (e.g. due to a malicious attack on the system using properly formatted data but not using valid data, or other such issues). This can also include any other such rule violation associated with eligibility systems configured by a merchant system 108 or account manager for account security system 140 during onboarding configurations as described above.

When the refund request is determined by eligibility 852 to include information for an eligible transaction, tokenization 854 systems are used to match any tokenized account data to an actual account number stored in a database 860. This can include automatically accessing a table that stores tokenized account numbers for transactions and clients to match the tokenized numbers to the actual numbers. Once the actual account number used for the transaction is identified, bank identification number (BIN) range service 856 systems are used to access any limits or operations for a particular BIN range, and additional security operations can be performed using the actual account number. This can include checking security breaches associated with an actual account number to confirm that the account number has not been compromised. This can also include any other such services associated with the account number that are not able to be performed without the account number (e.g. services not available using only tokenized data or other general non-sensitive client data). Once BIN range service 856 operations are complete, transaction service 858 initiates operations for the actual refund settlement 870 operations. As described above, refund settlement 870 operations can be performed by a system 130 or any other such system, and can further include any number of operations for settlement, including deductions from merchant accounts, transfers to client accounts, dispute settlement operations, data management for records, updates to shared data for account history and security data used to update security systems that analyze transaction data, or other such operations. Transaction service 858 systems can communicate with any such systems such as system 130 to provide the refund request data and any other data from database 860 as structured within refund operations for merchant system 108.

As described above, in some implementations, a single refund request communication from a merchant to an account security system can be used to authenticate the merchant once for refunds on multiple transactions with the merchant. These bundled refunds can be for multiple different clients, but with a single shared merchant that organizes the refund communication and bundles the information so that multiple refunds can be configured for settlement at the same time with a processor. In such implementations, there is a delay between the client request a refund and the merchant bundling the refunds for batch processing. Similarly, some configurations can allow further delays in the processing by the account security system (e.g. as described above in FIG. 8), including the operations within the account security system and the operations to settle the refunds.

In some such bundled implementations, a group of merchants can be organized together under a parent merchant organization, where each individual merchant has an associated child merchant identifier, and the parent merchant identifier is a shared identifier used for authentication by multiple merchants. Examples of such merchant structures allow account security systems to provide data security while allowing efficient payment and settlement to a set of merchants grouped within a system under the umbrella of a parent organization. This can allow harmonized interface configurations in website interfaces for child merchants operating under the parent structure, including harmonization of the transaction and refund operations. This can also allow efficient transactions and transaction reversals involving multiple child merchants, where authentication occurs at a parent merchant level, and settlement occurs at the child merchant level. In the same transaction, authorization, payments, and associated settlements to child merchants can occur individually while these individual operations rely on the parent merchant authentication. This can allow groups of merchants that naturally perform services together to provide simple transactions to a client, while limiting the back-end operations for the child merchants to distribute the single payment from the client among the child merchants. This can also allow system analytics for merchants that provide services together, and to bundle communications (e.g. transaction and refund communications) together for efficient system usage. Examples of such merchants can include independent doctor groups operating for a hospital or insurance network, construction groups with sub-contractors, vehicle repair shops with independent contractors, Internet websites that sell products for independent producers or multiple different merchants, and other such systems.

In one example in the context of FIG. 8, the merchant system 108 can be a parent merchant system that includes multiple child merchant systems. A communication from merchant system for accessing the refund API 850 can include both a parent merchant identifier (MID) as well as one or more child MIDs for the multiple refund requests bundled together. An access refund wrapper operation 712 can manage separating the individual transactions and processing them individually in refund eligibility & tokenization operations 714 and transactions operations 716 performed by eligibility 852 service, tokenization 854 service, bin range service 856, and transaction service 858. The child MID can then be used in refund settlement 870 for each individual refund after authentication is performed once for the batch using the parent MID.

Figure 9:
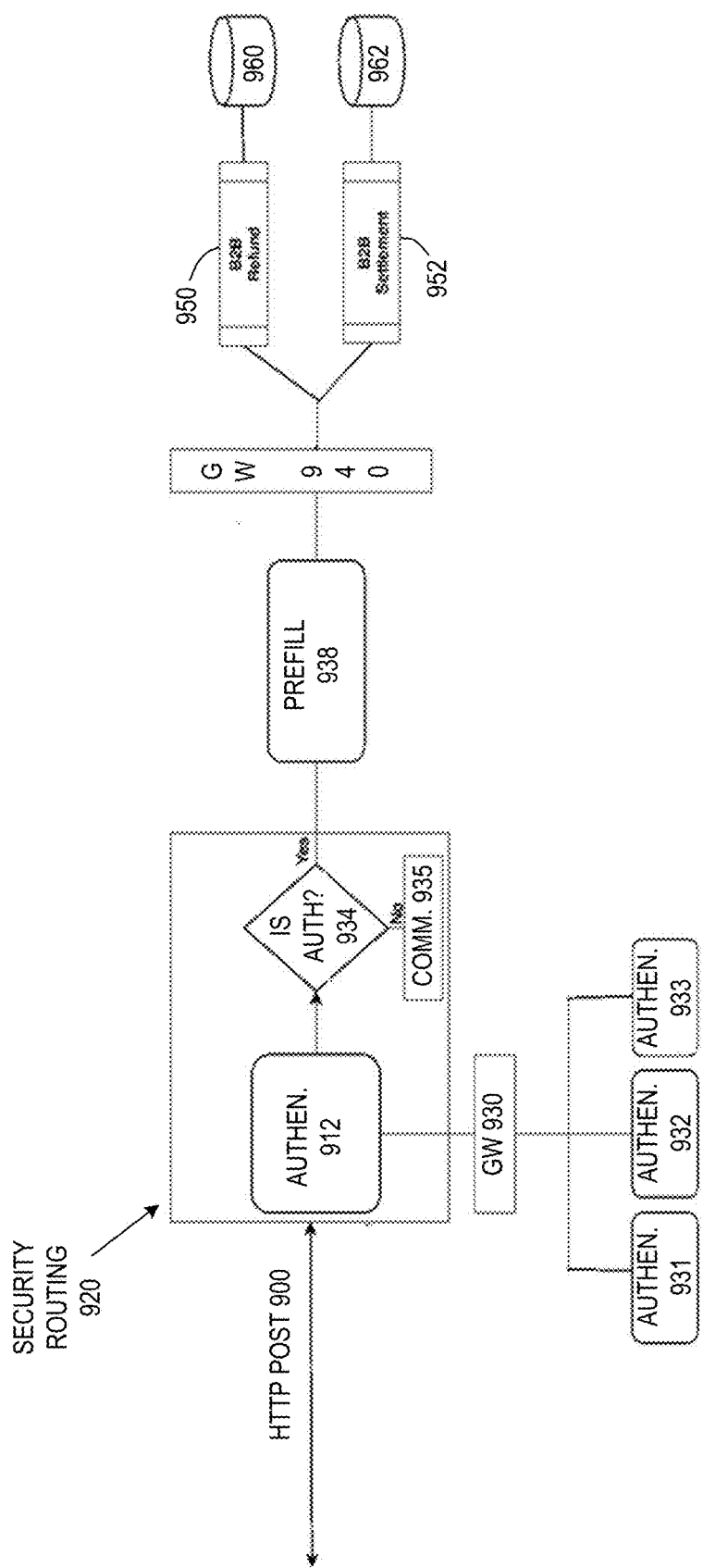
FIG. 9 depicts aspects of a system and system operations for data security and transaction management in accordance with some examples.
Figure 10:
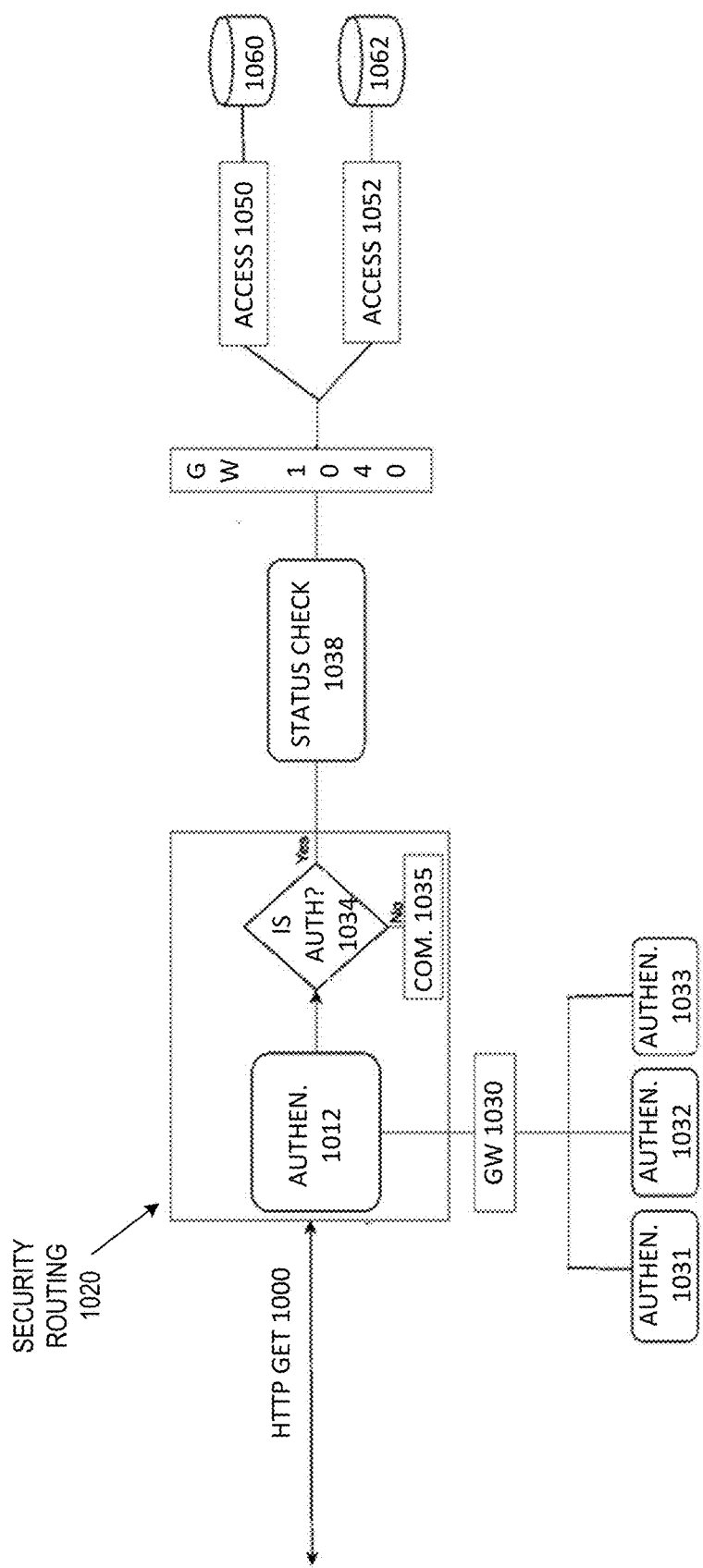
FIG. 10 depicts aspects of a system and system operations for data security in accordance with some examples.

FIGS. 9 and 10 then illustrate additional aspects of an account security system used to implement aspects of transactions and transaction reversal (e.g. refund) systems in accordance with one example. FIG. 9 illustrates a system response to an HTTP POST 900 communication received by the system. FIG. 10 illustrates a system response to an HTTP GET 900 communication received by the system.

As illustrated in FIG. 9, an HTTP POST 900 communication is initially handled by security routing 920 system. This includes an shared flow handler for authentication 912. This shared flow can use information from the HTTP POST 900 communication (e.g. MIDs, identifiers, passwords, and other such information) with multiple different authentication services. As illustrated, gateway 930 can be used to relay different groupings of information from the shared flow authentication 912 to authentication 931, 932, and 933 services. This can include the merchant authentication services used above in FIG. 3, additional business specific authentication services for refund handling, independent third party services, or any other such authentication service. These authentication 931-933 services return information to the shared flow authentication 912 handler. A decision is then made in operation 934. If the HTTP POST 900 fails the authentication, then a response communication 935 is returned indicating the HTTP POST 900 was not authorized. If the communication passes the authentication, then information from the HTTP POST 900 can be used for with prefill 938 service in prefilling data for communications with application databases as part of the operations indicated by the HTTP POST 900 communication. This can include any information described herein for placing or retrieving information in communication with an application database 960 or 962 via gateway 940 and associated business applications for a particular purpose. In this case, if HTTP POST 900 is associated with one or more transactions, then settlement 952 systems are used with application database 962. If HTTP POST 900 is associated with one or more refunds, then refund 950 systems are used with application database 960. The application databases 960 and 962 store processed request information. This information can then be used in pullback service responses to provide status information associated with transactions.

FIG. 10, then, illustrates a response to HTTP GET 1000. Just as above, security routing handles authentication and manages authentication gatekeeping. In the example of FIG. 10, security routing 1020 receives HTTP GET 1000, and shared flow authentication 1012 service manages multiple authentication services 1031, 1032, and 1033 via gateway 1030 (e.g. for a MID or parent MID or other merchant authorization structures). Decision operation 1034 results in a rejection communication 1035 (e.g. an HTTP 401 Unauthorized response) if the authentication fails, or passes information from HTTP GET 1000 if authentication passes.

Status check 1038 system then organizes the information using a selected communication format for interacting with the application databases. In some examples, status check 1038 can organize and fetch data from an application database using a reference identifier value. In other implementations, other such identifying data can be used. In the example of FIG. 10, gateway 1040 can route data to access 1050 and 1052 systems for application databases 1060 and 1062. While two different application databases are described in FIG. 10, different examples can include any number of application databases for systems serviced by an account security system. In some implementations, FIG. 10 can illustrate aspects of a system for access security result operations 334 and associated account access operations 338. In other implementations, other operational and communication flows can use a system such as the system of FIG. 10, or other similar systems can be used to store and access data for an account security system.

Similar to FIG. 3 above, the above operations of any subsequently described FIGs., including FIGS. 7-10, can be implemented as real-time automatic operations, where multiple instances of operations described above can occur simultaneously. For example, a single device implementing merchant system 108 can automatically perform multiple (e.g., thousands of simultaneous) instances of each of the operations described in FIGS. 3 and 7-10 for different transactions at the same time.

Figure 11:
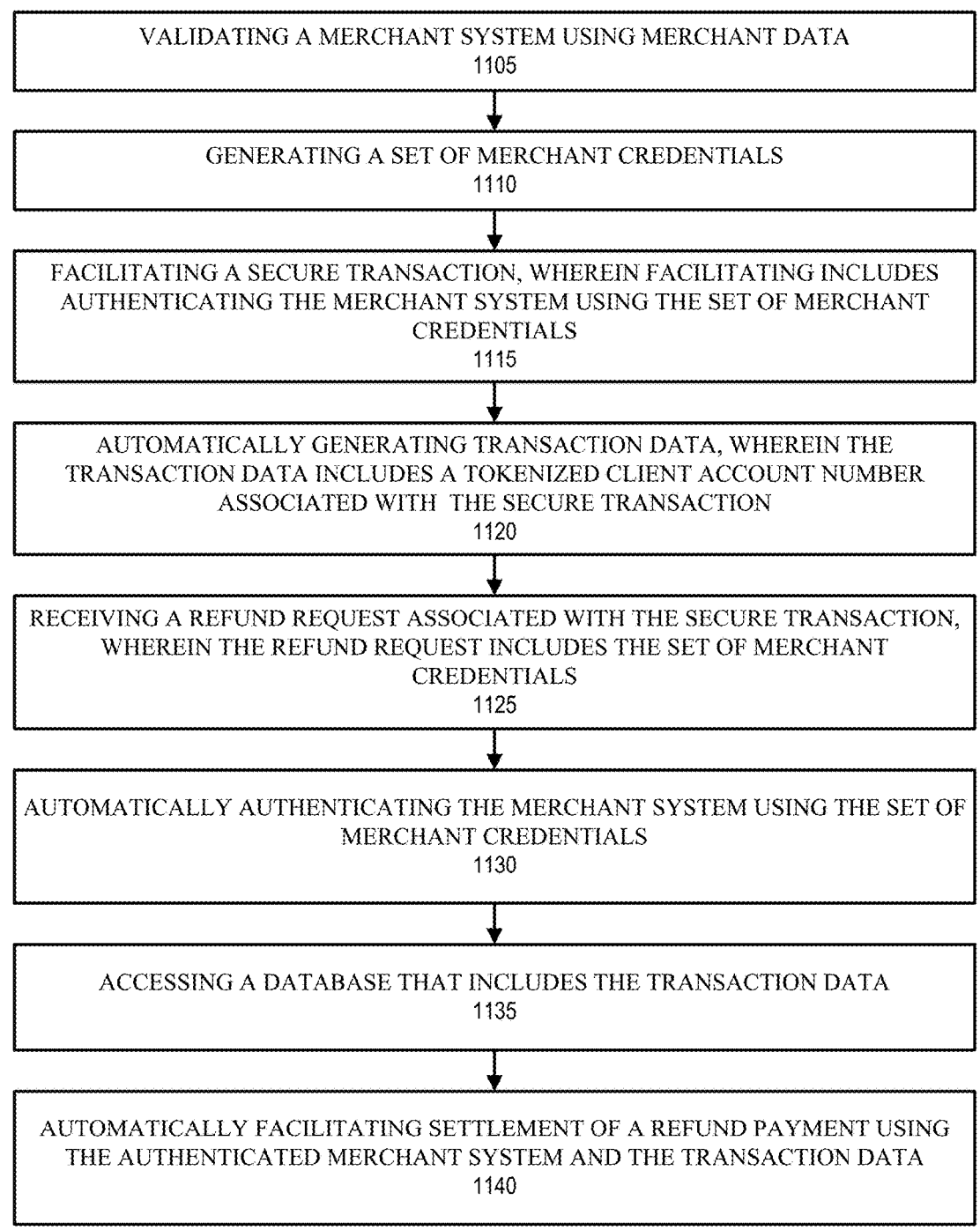
FIG. 11 is a flow diagram illustrating a method in accordance with some examples.

FIG. 11 is a flow diagram illustrating an example method 1100. Method 1100 can be performed by one or more processors of a server computer or server system as part of a merchant system interacting with an account security system (e.g. merchant system 108 interacting with account security system 140). Method 1100 can, in some examples, be implemented as computer readable instructions that, when executed by processing circuitry of a device, cause the device to perform steps of method 1100.

Operation 1105 of method 1100 includes validating a merchant system using merchant data. This can include any validation or authentication operations described herein, including analysis using identifying data associated with a merchant system, analysis of incoming communication data, communication patterns, machine learning and artificial intelligence security threat analysis, or other such verification operations. In some implementations, validation or authentication operations can be dynamically performed in real-time to improve the security of the system while maintaining quality of service (e.g., overall system responsiveness to client device 124 communications) and improving system performance with the use of a parent MID as described above. An account security system 140 can perform automatic and real-time processing operation 910 as well as operations 915 and 920 below for many customers simultaneously (e.g., thousands of checkout communications per minute, thousands of checkout communications per second, or more depending on system configurations).

Once a validation of the merchant system is successful, then a set of merchant credentials is generated in operation 1110. Such credentials can include a merchant identifier and password, security files, and MID, or any other such credentials for use with authenticating a merchant in future communications and operations.

Operation 1115 then involves facilitating a secure transaction, where facilitating includes authenticating the merchant system using the set of merchant credentials.

Transaction data is then generated in operation 1120, where the transaction data includes a tokenized client account number associated with the secure transaction. The tokenized account number can be performed according to any operation described herein, including operations to use random keys or random values with some or all of a client identifier or client BIN number to generate a tokenized client account number. In various systems, this tokenized client account number can then be automatically stored in a table or database and associated with the client, a transaction, a merchant, or any other such data. In some systems, the tokenized client data with other data can automatically be propagated from a table or database to other systems for use with additional security operations. Such automatic operations can include updates to machine learning or artificial intelligence systems with automatic updates to data, automatic account security checks that occur not only in real-time with a transaction, but also at scheduled or triggered intervals based on transaction and account data.

Operation 1125 of method 1100 then involves receiving a refund request associated with the secure transaction, where the refund request includes the set of merchant credentials. In some examples, the refund request is associated with a single merchant and a single transaction. In some examples, the refund request is associated with a plurality of transactions for the merchant system. This can include multiple transaction reversals within the refund request. As described above, this can include a parent merchant authentication with the batch refunds associated with one or more child merchants. In some examples, the refund request includes two or more of a channel identifier, a merchant number, a transaction amount, a description value, a security code, an address, and a partner code for each transaction of a plurality of transactions associated with the refund request. In various other examples, the refund request can include data from the secure transaction, the merchant credentials, or any other such information.

Operation 1130 of method 1100 includes authenticating the merchant system using the set of merchant credentials. When the refund request includes information for multiple refunds and multiple associated transactions, the authentication can be for a parent merchant, with the multiple refunds configured to be processed together under a single merchant authentication.

A database that includes the transaction data is then accessed in operation 1135 of method 1100. The database can include information about refund policies and eligibility. The database can also include information matching MIDs, tokenized data, client BINs, and other such information to the refund information in the refund request.

Operation 1140 then includes facilitating settlement of a refund payment using the authenticated merchant system and the transaction data. As described above, this can include providing the relevant information (e.g. an actual client account derived from tokenized account data received from a merchant) to a settlement system, providing status information to a merchant in response to a status request (e.g. an HTTP GET communication). The settlement systems, merchant systems, and client systems can then communicate to finalize any elements for the refund after the account security system matches the refund data to the sensitive client information needed to settle any refund to the client, as well as other transaction operations with the merchant and other parties to the original transaction.

Some examples can further operate by generating a prefill communication for a refund settlement request using the transaction data from the database in response to the refund request. This data can then be stored in one or more databases for use in finalizing the refund, or in providing a status update to a merchant system. In other examples, the prefill communication can be transmitted to a refund settlement system for use in finalizing the refund or performing further operations in response to the refund request.

In batch processing examples described above, some systems and methods can further operate by further accessing second transaction data in response to the refund request and facilitating a second refund payment for the second transaction data with the refund payment in a batch multi-refund process in response to the refund request. In some such systems, the set of merchant credentials includes a parent merchant identifier and at least one child merchant identifier. Where these MIDs or credentials are used, a parent MID can be used with authentication for multiple grouped transactions (e.g. both the first and second transaction data), and the at least one child MID can be used in settling the refunds. Such a system can operate where authenticating the merchant system uses the parent merchant identifier, and where the at least one child merchant identifier is used without the parent merchant identifier to facilitate the refund payment after the authenticating using the parent merchant identifier. Such examples can further process communications automatically (e.g., without human intervention) at high volume in real-time or near real-time (e.g., thousands of communications per second or per fraction of a second in some implementations).

These operations can, in various examples, be integrated with other operations for account security and operation of an account security system as described herein. Complementary operations performed by devices in the same network as an account security system performing operations described herein are examples in the context of the described innovations. In some examples, operations described above can be repeated, can include intervening operations, or can be performed concurrently for any number of secure transactions between different merchant systems and client devices. It will therefore be apparent that while methods specifically described herein are example implementations, other implementations are also possible in accordance with the details provided herein.

In various implementations some or all of the operations described above can be performed in real-time or near real-time. The real-time operations can include some or all of the operations of method 1100 or any other operations described above. Such automatic operations improve a system by enabling real-time or near real-time transactions with latencies and responsiveness in automatic operations not possible when operations involve human interaction (e.g., non-automatic operation). Additionally, operations can occur simultaneously as part of a single system processing multiple transactions. Similarly, communications for other transactions can be in process while such generating operations occur as part of operations facilitated by a single device or a system that includes one or more devices configured to implement method 1100 or other operations described herein. For example, the operations described above can be performed automatically by an account security system 140 in a network, without human interaction as part of the account security system 140 operations. Similarly, merchant system 108 and client device 124 can perform certain operations automatically (e.g., without human interaction or involvement). For example, a client device 124 can receive a non-automatic input (e.g., involving a human interaction with client device 124), which initiates a chain of automatic operations at merchant system 108, account security system 140, and client device 124 without further human involvement (e.g., automatic operations flowing from an initial non-automatic operation triggered by a human input at an interface of client device 124). Such automatic operations improve a system by enabling real-time or near real-time transactions with latencies and responsiveness in automatic operations not possible when operations involve human interaction (e.g., non-automatic operation).

Figure 12:
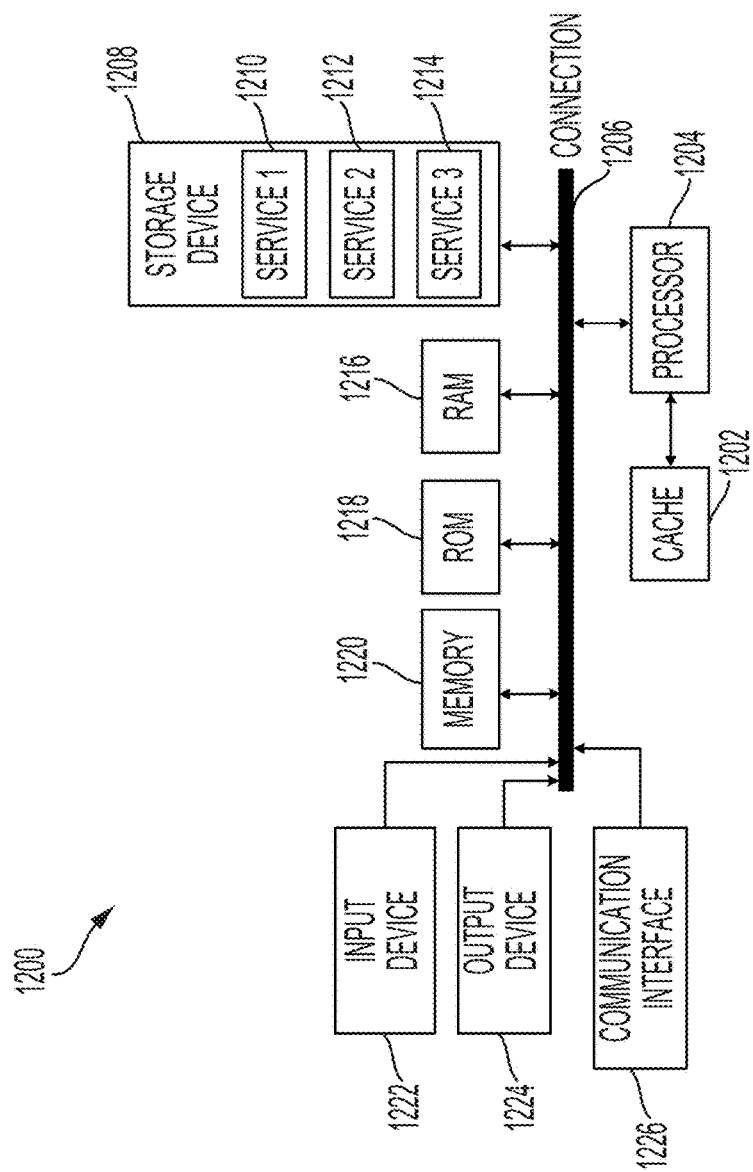
FIG. 12 shows a computing system architecture including various components in electrical communication with each other using a connection in accordance with various examples.

FIG. 12 illustrates a computing system architecture 1200 including various components in electrical communication with each other using a connection 1206, such as a bus, in accordance with some implementations. Example system architecture 1200 includes a processing unit (CPU or processor) 1204 and a system connection 1206 that couples various system components including the system memory 1220, such as ROM 1218 and RAM 1216, to the processor 1204. The system architecture 1200 can include a cache 1202 of high-speed memory connected directly with, in close proximity to, or integrated as part of the processor 1204. The system architecture 1200 can copy data from the memory 1220 and/or the storage device 1208 to the cache 1202 for quick access by the processor 1204. In this way, the cache can provide a performance boost that avoids processor 1204 delays while waiting for data. These and other modules can control or be configured to control the processor 1204 to perform various actions.

Other system memory 1220 may be available for use as well. The memory 1220 can include multiple different types of memory with different performance characteristics. The processor 1204 can include any general purpose processor and a hardware or software service, such as service 1 1210, service 2 1212, and service 3 1214 stored in storage device 1208, configured to control the processor 1204 as well as a special-purpose processor where software instructions are incorporated into the actual processor design. The processor 1204 may be a completely self-contained computing system, containing multiple cores or processors, a bus, memory controller, cache, etc. A multi-core processor may be symmetric or asymmetric.

To enable user interaction with the computing system architecture 1200, an input device 1222 can represent any number of input mechanisms, such as a microphone for speech, a touch-sensitive screen for gesture or graphical input, keyboard, mouse, motion input, speech and so forth. An output device 1224 can also be one or more of a number of output mechanisms known to those of skill in the art. In some instances, multimodal systems can enable a user to provide multiple types of input to communicate with the computing system architecture 1200. The communications interface 1226 can generally govern and manage the user input and system output. There is no restriction on operating on any particular hardware arrangement and therefore the basic features here may easily be substituted for improved hardware or firmware arrangements as they are developed.

Storage device 1208 is a non-volatile memory and can be a hard disk or other types of computer readable media which can store data that are accessible by a computer, such as magnetic cassettes, flash memory cards, solid state memory devices, digital versatile disks, cartridges, RAMs 1216, ROM 1218, and hybrids thereof.

The storage device 1208 can include services 1210, 1212, 1214 for controlling the processor 1204. Other hardware or software modules are contemplated. The storage device 1208 can be connected to the system connection 1206. In one aspect, a hardware module that performs a particular function can include the software component stored in a computer-readable medium in connection with the necessary hardware components, such as the processor 1204, connection 1206, output device 1224, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIG. 8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method for improved security in a communication system, the method comprising:
processing merchant data using one or more processors of an account security system to validate a merchant system using the merchant data;
generating, by the account security system, a set of merchant credentials, wherein the set of merchant credentials includes a parent merchant identifier and a child merchant identifier;
wherein a child merchant system associated with the child merchant identifier operates under a parent structure with harmonized transaction and refund operations with a parent merchant system associated with the parent merchant identifier;
receiving, by the account security system, sensitive client data including a client account number, wherein the sensitive client data is received as part of a secure transaction between the merchant system and a client device;
automatically generating transaction data using the account security system, wherein the transaction data includes a tokenized client account number associated with the secure transaction, wherein the tokenized client account number isolates the merchant system from the client account number;
receiving, at a batch reversal system of the account security system, a refund request associated with the secure transaction, wherein the refund request includes the set of merchant credentials;
automatically authenticating the merchant system using the parent merchant identifier at a parent account layer of the account security system;
processing the refund request using a prefill service to format a database communication;
accessing, by a refund application programming interface (API) of the account security system using the database communication, a database that includes the transaction data;
aggregating the refund request with a plurality of refund requests using the batch reversal system at a child account layer of the account security system;
scheduling batch processing for the plurality of refund requests for a scheduled time when spare resources of the account security system are available; and
automatically facilitating settlement of a refund payment to the child merchant system by the batch reversal system at the child account layer of the account security system using the merchant system authentication and the transaction data in a repeated automatic looped process at the scheduled time for the plurality of refund requests, wherein the child merchant identifier is used without the parent merchant identifier to facilitate the refund payment after the merchant system authentication using the parent merchant identifier.

2. The computer-implemented method of claim 1, wherein the refund request is associated with a plurality of transactions for the merchant system.

3. The computer-implemented method of claim 1, wherein the refund request includes two or more of a channel identifier, a merchant number, a transaction amount, a description value, a security code, an address, and a partner code for each transaction of a plurality of transactions associated with the refund request.

4. The computer-implemented method of claim 1 further comprising:
generating a prefill communication for a refund settlement request using the transaction data from the database in response to the refund request; and
transmitting the prefill communication to a refund settlement system.

5. The computer-implemented method of claim 1 further comprising:
accessing second transaction data in response to the refund request; and
facilitating a second refund payment for the second transaction data with the refund payment in a batch multi-refund process in response to the refund request.

6. The computer-implemented method of claim 1, further comprising:
matching the tokenized account number to the client account number using the database of the account security system; and
performing a bank identification number (BIN) range service check to confirm that the client account number has not been compromised.

7. The computer-implemented method of claim 1, further comprising:
filtering the database communication as formatted by the prefill service using a gateway system to perform a formatting check on data of the refund request;
receiving the database communication at an eligibility service of the account security system via the refund API; and
processing, by the eligibility service of the account security system, the database communication to determine a refund eligibility associated with the child merchant system.

8. The computer-implemented method of claim 1, wherein the refund request includes a hypertext transport protocol (HTTP) post communication.

9. The computer-implemented method of claim 1, wherein the refund request includes a hypertext transport protocol (HTTP) get communication.

10. An account security system for providing improved communication security, the account security system comprising:
a memory; and
one or more processors coupled to the memory and configured to perform operations including:
processing merchant data using the one or more processors of the account security system to validate a merchant system using the merchant data;
generating, by the account security system, a set of merchant credentials, wherein the set of merchant credentials includes a parent merchant identifier and a child merchant identifier, wherein a child merchant system associated with the child merchant identifier operates under a parent structure with harmonized transaction and refund operations with a parent merchant system associated with the parent merchant identifier;
receiving, by the account security system, sensitive client data including a client account number, wherein the sensitive client data is received as part of a secure transaction between the merchant system and a client device;

automatically generating transaction data using the account security system, wherein the transaction data includes a tokenized client account number associated with the secure transaction, wherein the tokenized client account number isolates the merchant system from the client account number;

receiving, at a batch reversal system of the account security system, a refund request associated with the secure transaction, wherein the refund request includes the set of merchant credentials;

automatically authenticating the merchant system using the parent merchant identifier at a parent account layer of the account security system;

processing the refund request using a prefill service to format a database communication;

accessing, by a refund application programming interface (API) of the account security system using the database communication, a database that includes the transaction data;

aggregating the refund request with a plurality of refund requests using the batch reversal system at a child account layer of the account security system;

scheduling batch processing for the plurality of refund requests for a scheduled time when spare resources of the account security system are available; and automatically facilitating settlement of a refund payment to the child merchant system by the batch reversal system at the child account layer of the account security system using the merchant system authentication and the transaction data in a repeated automatic looped process at the scheduled time for the plurality of refund requests, wherein the child merchant identifier is used without the parent merchant identifier to facilitate the refund payment after the merchant system authentication using the parent merchant identifier.

11. The system of claim 10, wherein the refund request is associated with a plurality of transactions for the merchant system.

12. The system of claim 10, wherein the refund request includes two or more of a channel identifier, a merchant number, a transaction amount, a description value, a security code, an address, and a partner code for each transaction of a plurality of transactions associated with the refund request.

13. The system of claim 10, wherein the one or more processors further perform operations comprising:
generating a prefill communication for a refund settlement request using the transaction data from the database in response to the refund request; and
transmitting the prefill communication to a refund settlement system.

14. The system of claim 10, wherein the one or more processors further perform operations comprising:
accessing second transaction data in response to the refund request; and
facilitating a second refund payment for the second transaction data with the refund payment in a batch multi-refund process in response to the refund request.

15. A non-transitory computer readable medium comprising instructions that, when executed by one or more processors of an account security system-device, cause the account security system to perform operations comprising:
validating processing merchant data using the one or more processors of the account security system to validate a merchant system using the merchant data;
generating, by the account security system, a set of merchant credentials, wherein the set of merchant credentials includes a parent merchant identifier and a child merchant identifier, wherein a child merchant system associated with the child merchant identifier operates under a parent structure with harmonized transaction and refund operations with a parent merchant system associated with the parent merchant identifier;

receiving, by the account security system, sensitive client data including a client account number, wherein the sensitive client data is received as part of a secure transaction between the merchant system and a client device;

automatically generating transaction data using the account security system, wherein the transaction data includes a tokenized client account number associated with the secure transaction, wherein the tokenized client account number isolates the merchant system from the client account number;

receiving, at a batch reversal system of the account security system, a refund request associated with the secure transaction, wherein the refund request includes the set of merchant credentials;

automatically authenticating the merchant system using the parent merchant identifier at a parent account layer of the account security system;

processing the refund request using a prefill service to format a database communication;

accessing, by a refund application programming interface (API) of the account security system using the database communication, a database that includes the transaction data;

aggregating the refund request with a plurality of refund requests using the batch reversal system at a child account layer of the account security system;

scheduling batch processing for the plurality of refund requests for a scheduled time when spare resources of the account security system are available; and automatically facilitating settlement of a refund payment to the child merchant system by the batch reversal system at the child account layer of the account security system using the merchant system authentication and the transaction data in a repeated automatic looped process at the scheduled time for the plurality of refund requests, wherein the child merchant identifier is used without the parent merchant identifier to facilitate the refund payment after the merchant system authentication using the parent merchant identifier.

16. The non-transitory medium of claim 15, wherein the refund request is associated with a plurality of transactions for the merchant system.

17. The non-transitory medium of claim 15, wherein the refund request includes two or more of a channel identifier, a merchant number, a transaction amount, a description value, a security code, an address, and a partner code for each transaction of a plurality of transactions associated with the refund request.

18. The non-transitory medium of claim 15, wherein the instructions cause the one or more processors to perform operations further comprising:
generating a prefill communication for a refund settlement request using the transaction data from the database in response to the refund request; and
transmitting the prefill communication to a refund settlement system.

* * * * *